US011573315B2

(12) United States Patent
Ootaka et al.

(10) Patent No.: US 11,573,315 B2
(45) Date of Patent: Feb. 7, 2023

(54) DISTANCE MEASURING DEVICE AND DISTANCE MEASURING METHOD

(71) Applicants: Kabushiki Kaisha Toshiba, Tokyo (JP); Toshiba Electronic Devices & Storage Corporation, Tokyo (JP)

(72) Inventors: Shoji Ootaka, Yokohama Kanagawa (JP); Takayuki Kato, Kawasaki Kanagawa (JP); Masaki Nishikawa, Yokohama Kanagawa (JP); Hiroshi Yoshida, Yokohama Kanagawa (JP); Katsuya Nonin, Kawasaki Kanagawa (JP); Yoshiharu Nito, Yokohama Kanagawa (JP); Masayoshi Oshiro, Ota Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 385 days.

(21) Appl. No.: 16/811,269

(22) Filed: Mar. 6, 2020

(65) Prior Publication Data
US 2021/0088646 A1 Mar. 25, 2021

(30) Foreign Application Priority Data
Sep. 19, 2019 (JP) .............................. JP2019-170829

(51) Int. Cl.
*G01S 13/84* (2006.01)
*G01S 7/285* (2006.01)
*G01S 13/38* (2006.01)

(52) U.S. Cl.
CPC .............. *G01S 13/84* (2013.01); *G01S 7/285* (2013.01); *G01S 13/38* (2013.01)

(58) Field of Classification Search
CPC ........... G01S 7/285; G01S 13/84; G01S 13/38
See application file for complete search history.

(56) References Cited

U.S. PATENT DOCUMENTS 5,589,821 A * 12/1996 Sallen ................ G08B 21/0227
342/127
5,959,568 A * 9/1999 Woolley ................ G01S 13/878
340/568.1

(Continued)

FOREIGN PATENT DOCUMENTS

EP 3517995 A1 7/2019
JP 3366615 B2 1/2003

(Continued)

*Primary Examiner* — Marcus E Windrich
(74) *Attorney, Agent, or Firm* — Allen & Overy LLP

(57) ABSTRACT

According to an embodiment, a first device includes: a first transceiver configured to transmit two or more first carrier signals using an output of a first reference signal source and to receive two or more second carrier signals; and a calculation unit, and a second device includes: a second transceiver configured to transmit the two or more second carrier signals using an output of a second reference signal source that operates independently of the first reference signal source and to receive the two or more first carrier signals. A frequency group of the two or more first carrier signals and a frequency group of the two or more second carrier signals are identical or substantially identical to each other, and the calculation unit calculates the distance between the first device and the second device based on a phase detection result obtained by receiving the first and second carrier signals.

8 Claims, 17 Drawing Sheets

(56) References Cited

U.S. PATENT DOCUMENTS

| | | | |
|---|---|---|---|
| 10,502,808 B2 | 12/2019 | Nishikawa | |
| 2010/0167662 A1* | 7/2010 | Kluge | H04W 24/06 |
| | | | 455/67.16 |
| 2014/0159961 A1* | 6/2014 | Ware | G01S 13/84 |
| | | | 342/385 |
| 2018/0267154 A1* | 9/2018 | Ootaka | G01S 7/4912 |
| 2018/0267155 A1* | 9/2018 | Shimizu | G01S 7/4912 |
| 2018/0321371 A1 | 11/2018 | Leconte | |
| 2019/0227141 A1 | 7/2019 | Nishikawa | |
| 2020/0081088 A1 | 3/2020 | Nishikawa | |
| 2022/0142596 A1* | 5/2022 | Yoshida | A61B 6/54 |

FOREIGN PATENT DOCUMENTS

| | | |
|---|---|---|
| JP | 2008-122255 A | 5/2008 |
| JP | 5117999 B2 | 1/2013 |
| JP | 2018-155724 A | 10/2018 |

\* cited by examiner

DISTANCE MEASURING DEVICE AND DISTANCE MEASURING METHOD

CROSS-REFERENCE TO RELATED APPLICATION

This application is based upon and claims the benefit of priority from the prior Japanese Patent Application No. 2019-170829 filed in Japan on Sep. 19, 2019; the entire contents of which are incorporated herein by reference.

FIELD

Embodiments described herein relate generally to a distance measuring device and a distance measuring method.

BACKGROUND

In recent years, keyless entry systems have been adopted in many cars to facilitate locking and unlocking of the cars. According to such a technique, a user of the car can lock and unlock doors using communication between a key of the car and the car. Furthermore, smart key systems, which allow users to lock and unlock doors or start an engine without touching a key, have been widely used in recent years.

However, incidents frequently happen that an attacker who performs a so-called relay attack intrudes into the communication between the key and the car and steals the car or articles in the car. A countermeasure against the attack, that is, a so-called relay attack, is being taken to measure a distance between the key and the car and prohibit control of the car due to the communication when the measured distance is determined to be equal to or greater than a predetermined distance.

Examples of distance measuring methods include a time detection method, a frequency difference detection method, and a phase detection method. However, a distance measuring system employing a communication-type phase detection method for obtaining a distance between respective devices due to communication between the respective devices has been paid attention from the viewpoint of simplicity of mounting. However, since reference signals between the respective devices operate independently, initial phases are different from each other, and thus distance measurement accuracy generally deteriorates significantly in the communication-type phase detection method. Therefore, a technique has been proposed which enables distance measurement by transmitting phase information detected by one device to the other device. According to the proposal, an accurate distance can be calculated by a predetermined arithmetic operation using phase information of signals detected by receiving units of a pair of two distance measuring devices.

At the same time, the battery life of the key needs to be extended since the distance measuring device is also mounted on the key side, and low power consumption of the distance measuring device is required. Since most of the power consumption of the distance measuring device is consumed by the radio unit, low power consumption of the radio unit is required. The power consumption of the radio unit strongly depends on architecture of the radio unit. An example of the widely known low power consumption configuration includes a configuration in which a voltage controlled oscillator (VCO) direct modulation method (hereinafter also referred to as VCO direct modulation method) is used for a transmitting unit and a superheterodyne (SH) method (hereinafter also referred to as SH method) or a Low-IF reception method is used for a receiving unit. Therefore, the distance measuring device is desirably implemented by the configuration in which the VCO direct modulation method is used for the transmitting unit and the SH method is used for the receiving unit. However, in the case where the distance is measured using the VCO direct modulation method for the transmitting unit and the SH method for the receiving unit, accurate distance measurement can hardly be performed even when the proposed technique described above is used.

DETAILED DESCRIPTION

According to an embodiment, a distance measuring device configured to calculate a distance based on carrier phase detection includes: a calculation unit configured to, based on phase information acquired by a first device and a second device, at least one of the devices being movable, calculate a distance between the first device and the second device. The first device includes: a first reference signal source; and a first transceiver configured to transmit two or more first carrier signals using an output of the first reference signal source and to receive two or more second carrier signals. The second device includes: a second reference signal source that operates independently of the first reference signal source; and a second transceiver configured to transmit the two or more second carrier signals using an output of the second reference signal source and to receive the two or more first carrier signals. A frequency group of the two or more first carrier signals and a frequency group of the two or more second carrier signals are identical or substantially identical to each other, the calculation unit calculates the distance based on a phase detection result obtained by receiving the first carrier signals and the second carrier signals, and the first and second reference signal sources operate continuously during a period when the first and second carrier signals are transmitted and received by the first and second transceivers.

Embodiments will be described below with reference to the drawings.

First Embodiment (Configuration)

First, a reason why accurate distance measurement can hardly be performed even using phase information of signals detected by receiving units of a pair of two distance measuring devices in a distance measuring device configured to use a voltage controlled oscillator (VCO) direct modulation method for a transmitting unit and a superheterodyne (SH) method for a receiving unit will be described.

Figure 1:
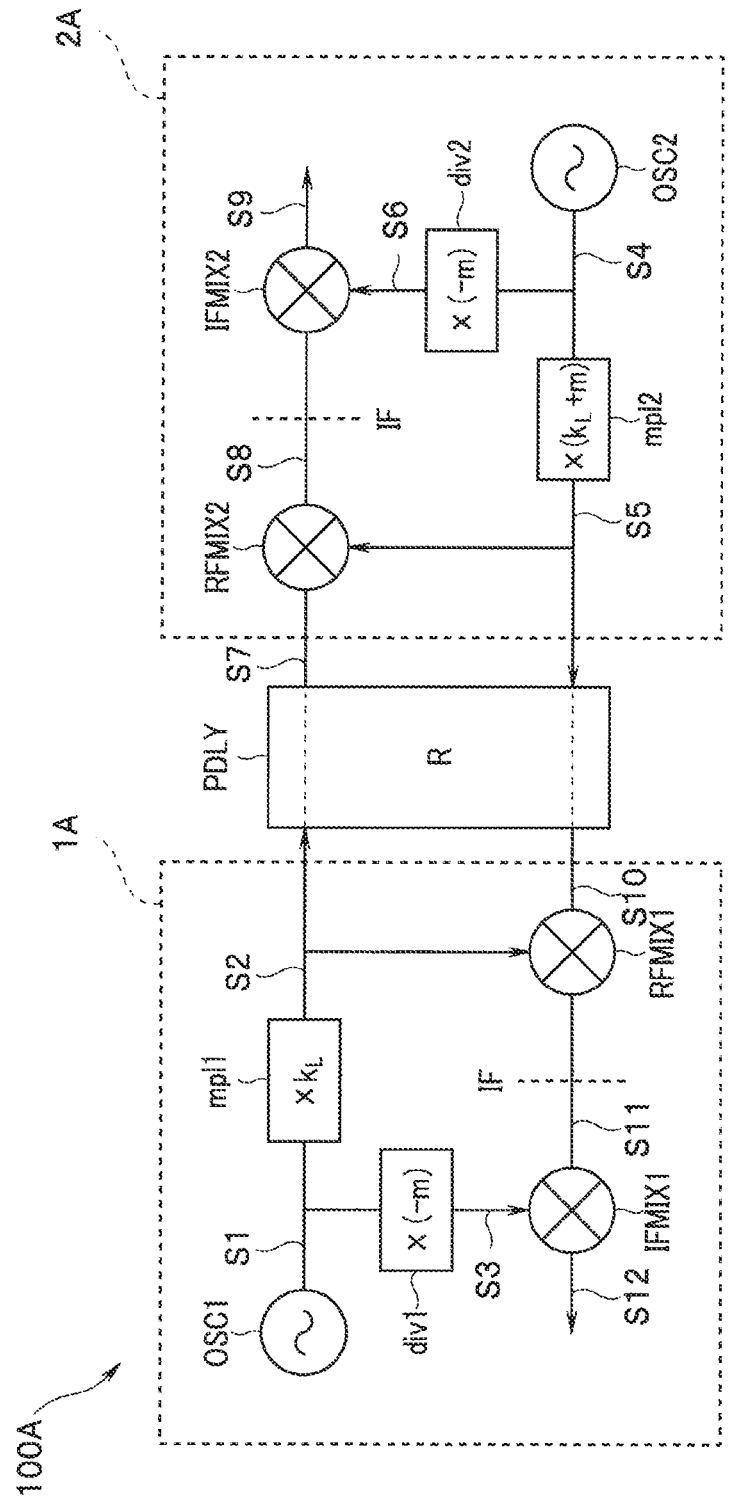
FIG. 1 is a configuration diagram of a radio circuit of a distance measuring system in which a distance between two devices is measured by a communication-type phase detection method.

FIG. 1 is a configuration diagram of a radio circuit of a distance measuring system in which a distance between two devices is measured by a communication-type phase detection method. A distance measuring system 100A includes a device 1A and a device 2A. At least one of the device 1A and the device 2A is movable. The distance measuring system 100A calculates a distance between the device 1A and the device 2A based on carrier phase detection. A case is considered in which one of the device 1A and the device 2A calculates a distance based on phase information acquired by the device 1A and the device 2A.

The device 1A transmits a first distance measuring signal, and the device 2A transmits a second distance measuring signal. The first and second distance measuring signals reach the device 2A and the device 1A, respectively, via a propagation path PDLY between the device 1A and the device 2A. The device 1A and the device 2A include a radio circuit using a low power consumption VCO direct modulation method for the transmitting unit and a low power consumption SH method for the receiving unit.

FIG. 1 illustrates a configuration of a radio unit simplified in the device 1A and the device 2A. The device 1A includes a device-specific oscillator 1 (hereinafter referred to as OSC1), a frequency multiplier 1 (hereinafter referred to as mpl1), an RF frequency converter 1 (hereinafter referred to as RFMIX1), a frequency divider 1 (hereinafter referred to as div1), and an intermediate (IF) frequency converter 1 (hereinafter referred to as IFMIX1). The device 2A also has a radio architecture similar to the device 1A, and includes a device-specific oscillator 2 (hereinafter referred to as OSC2), a frequency multiplier 2 (hereinafter referred to as mpl2), an RF frequency converter 2 (hereinafter referred to as RFMIX2), a frequency divider 2 (hereinafter referred to as div2), and an intermediate (IF) frequency converter 2 (hereinafter referred to as IFMIX2).

First, a case is considered in which the device 1A transmits a first distance measuring signal of a single tone wave to the device 2A and the device 2A receives the first distance measuring signal of a single tone wave sent from the device 1A.

An oscillation frequency of the OSC1, which is a reference signal source, is $f_{x1}$, and an oscillation frequency of the OSC2, which is a reference signal source operating independently of the OSC1, is $f_{x2}$. The OSC1 and the OSC2 continue to operate during a period in which a first and second carrier signals are transmitted and received by transceivers of the device 1 and the device 2. An output signal S1 of the OSC1 is input to the mpl1, and an output signal S4 of the OSC2 is input to the mpl2.

An output signal S2 of the mpl1 is input to the RFMIX1, and the RFMIX1 down-converts the second distance measuring signal received from the device 2A and outputs the output signal S11 to the IFMIX1. An output signal S3 from the div1 and the output signal S11 from the RFMIX1 are input to the IFMIX1, and the IFMIX1 outputs an output signal S12 which is an IQ signal. An output signal S5 of the mpl2 is input to the RFMIX2. RFMIX2 down-converts the first distance measuring signal received from the device 1A and outputs an output signal S8 to the IFMIX2. The IFMIX2 receives a signal S6 from the div2 and the signal S8 from the RFMIX2, and outputs an output signal S9 which is an IQ signal.

The mpl1 multiplies the oscillation frequency $f_{x1}$ of the output signal S1 from the OSC1 by $k_L$, and then supplies the output signal S2 to an antenna, whereby the first distance measuring signal is transmitted from the device 1A. Here, the output signal S1 of the OSC1 is expressed by Equation (1) as follows.

$$lo_{x1} = \sin(2\pi f_{x1} t + \theta_{x1}) \quad (1)$$

A phase of the output signal S2 of the mpl1, which has received the output signal S1 of the OSC1, is expressed by Equation (2) as follows.

$$\phi_{tx1} = 2\pi k_L f_{x1} t + \theta_{Lx1} \quad (2)$$

Here, the phase $\theta_{x1}$ represents an initial phase of a reference oscillation signal of the OSC1, the phase $\theta_{Lx1}$ represents an initial phase of the output signal S2 of the mpl1. The output signal S2 of the mpl1 is generated by a phase locked loop (PLL) technique and a voltage controlled oscillator (VCO) technique in general.

On the other hand, since the device 2A receives the first distance measuring signal which is an RF frequency signal output from the device 1A, the first distance measuring signal is input to the RFMIX2 of the device 2A. The output signal S5 of the mpl2 is input to the RFMIX2. A frequency of the output signal S5 of the mpl2 is not $k_L$ times $f_{x2}$ but $(k_L+m)$ times $f_{x2}$. The reason is that a frequency of the signal transmitted from the device 1A is $k_L f_{x1}$ and an intermediate frequency (hereinafter referred to as IF frequency) is set to about $(-m)$ times as large as the oscillation frequency $f_{x2}$ after frequency conversion by the RFMIX2 of the device 2A. At this time, a phase of the output signal S5 is expressed by Equation (3) as follows.

$$\phi_{tx2}=2\pi(kL+m)f_{x2}t+\theta_{Lmx2} \tag{3}$$

Here, the phase $\theta_{Lmx2}$ represents an initial phase of the output signal S5 when the mpl2 sets the frequency setting to $(k_L+m)f_{x2}$. The output signal S5 of the mpl2 is used as a local oscillation (LO) signal input to the RFMIX2. The first distance measuring signal, which is a reception signal subjected to frequency conversion by the RFMIX2, is demodulated by a demodulator (not illustrated) via the IFMIX2, and the phase is detected. A frequency of a local oscillation (LO) signal for the IFMIX2 input to the IFMIX2 is set to be $(-m)$ times the oscillation frequency of the OSC2, and a phase of the output signal S6 of the div2 is expressed by Equation (4) as follows.

$$\phi_{b2}=-m2\pi f_{x2}t+\theta_{Bx2} \tag{4}$$

Here, the phase $\theta_{Bx2}$ represents an initial phase of the local oscillation (LO) signal for the IFMIX2, and the frequency $(-mf_{x2})$ represents an IF frequency.

Figure 2:
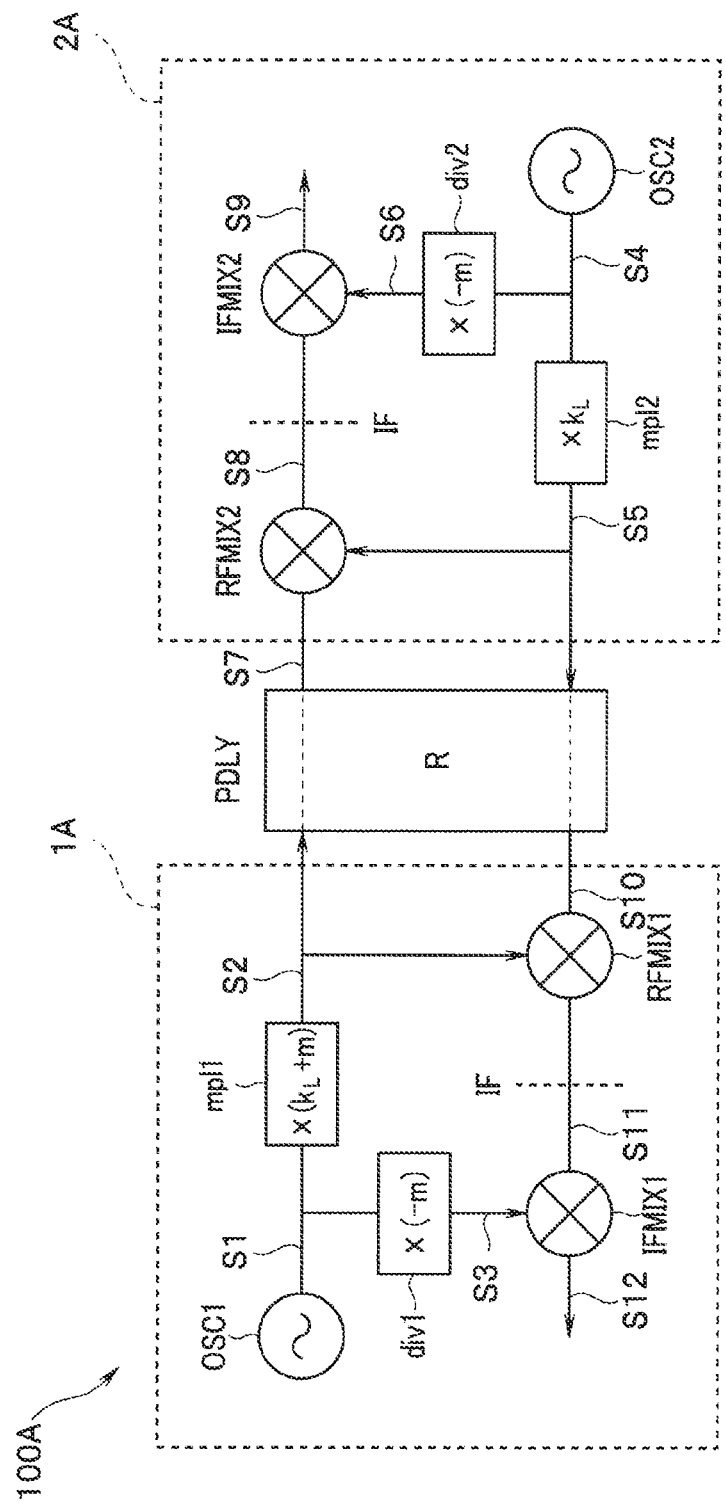
FIG. 2 is a configuration diagram of a radio circuit of a distance measuring system in which a distance between two devices is measured by a communication-type phase detection method.

Next, a case will be described using FIG. 2 in which the second distance measuring signal of a single tone wave is sent from the device 2A to the device 1A. FIG. 2 is a configuration diagram of the radio circuit of the distance measuring system in which the distance between two devices is measured by the communication-type phase detection method. The output signal S4 of the OSC2, which is the reference oscillation signal of the device 2A, is expressed by Equation (5) as follows.

$$lo_{x2}=\sin(2\pi f_{x2}t+\theta_{x2}) \tag{5}$$

The phase of the output signal S5 of the mpl2, which has received the output signal S4 of the OSC2, is expressed by Equation (6) as follows.

$$\phi_{tx2}=2\pi k_L f_{x2}t+\theta_{Lx2} \tag{6}$$

Here, the $\theta_{x2}$ is an initial phase of the reference oscillation signal of the OSC2, and the phase $\theta_{Lx2}$ is an initial phase of the output signal S5 of the mpl2. The output signal S5 of the mpl2 is generated by a phase locked loop (PLL) technique and a voltage controlled oscillator (VCO) technique in general.

On the other hand, since the device 1A receives the second distance measuring signal which is an RF frequency signal output from the device 2A, the second distance measuring signal is input to the RFMIX1. The output signal S2 of the mpl1 is also input to the RFMIX1. A frequency of the output signal S2 of the mpl1 is not $k_L$ times $f_{x1}$ but $(k_L+m)$ times $f_{x1}$. The reason is that a frequency of the signal transmitted from the device 2A is $k_L f_{x2}$ and an IF frequency is set to about m times as large as the oscillation frequency $f_{x1}$ after frequency conversion by the RFMIX1 of the device 1A. At this time, a phase of the output signal S2 is expressed by Equation (7) as follows.

$$\phi_{tx1}=2\pi(k_L+m)f_{x1}t+\theta_{Lmx1} \tag{7}$$

Here, the $\theta_{Lmx1}$ represents an initial phase when the mpl1 sets the frequency setting to $(k_L+m)f_{x1}$. The output signal S2 of the mpl1 is used as a local oscillation (LO) signal input to the RFMIX1. The second distance measuring signal, which is a reception signal subjected to frequency conversion by the RFMIX1, is demodulated by a demodulator (not illustrated) via the IFMIX1, and the phase is detected. A frequency of an LO signal for the IFMIX1 input to the IFMIX1 is set to be $(-m)$ times the oscillation frequency of the OSC2, and a phase of the output signal S3 of the div1 is expressed by Equation (8) as follows.

$$\phi_{b1}=-m2\pi f_{x1}t+\theta_{Bx1} \tag{8}$$

Here, the $\theta_{Bx1}$ represents an initial phase of the local oscillation (LO) signal for the IFMIX1, and the frequency $(-mf_{x1})$ represents an IF frequency.

Figure 3:
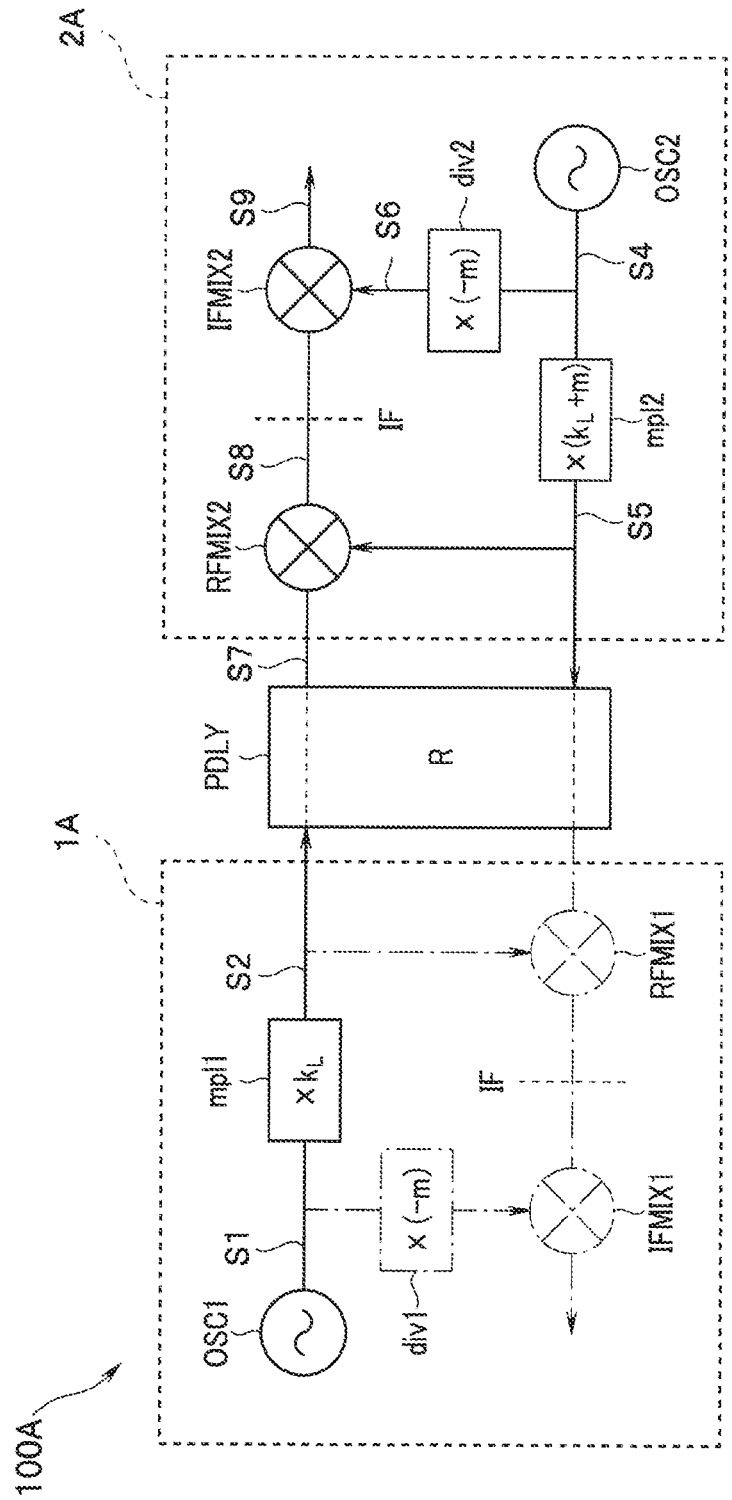
FIG. 3 is a configuration diagram of a radio circuit of a distance measuring system for describing a phase detected from a distance measuring signal transmitted from one of two devices.

A description will be given below with reference to FIG. 3 with respect to phase information detected by the device 2A from the first distance measuring signal of the frequency $k_L f_{x1}$ received by the device 2A and transmitted from the device 1A. FIG. 3 is a configuration diagram of the radio circuit of the distance measuring system for describing a phase detected from the distance measuring signal transmitted from one of the two devices. In FIG. 3, the div1, the RFMIX1, and the IFMIX1 have no relation to the operation and are indicated by one-dot chain lines. A phase of the first distance measuring signal S7 after passing through the propagation path PDLY is expressed by Equation (9) as follows.

$$\phi_{rx2}=2\pi k_L f_{x1}t(t-\tau_R)+\theta_{Lx1} \tag{9}$$

Here, the R represents a delay time of the propagation path. The first distance measuring signal S7 is subjected to frequency conversion by the output signal S5 of the mpl2, and a phase of the output signal S8 of the RFMIX2 is expressed by Equation (10) as follows.

$$\phi_{ifx2}(t)=2\pi k_L(f_{x1}-f_{x2})t-2\pi m f_{x2}t+(\theta_{Lx1}-\theta_{Lmx2})-2\pi k_L f_{x1}\tau_R \tag{10}$$

Here, the result of extraction of only a desired signal is indicated. The output signal S8 is subjected to frequency conversion by the output signal S6 of the div2, and a phase of the output signal S9 of the IFMIX2 detected by the device 2A is expressed by Equation (11) as follows.

$$\phi_{BB2L}(t)=2\pi k_L(f_{x1}-f_{x2})t+(\theta_{Lx1}-\theta_{Lmx2})-\theta_{Bx2}-2\pi k_L f_{x1}\tau_R \tag{11}$$

Here, the result of desired quadrature demodulation is described.

Figure 4:
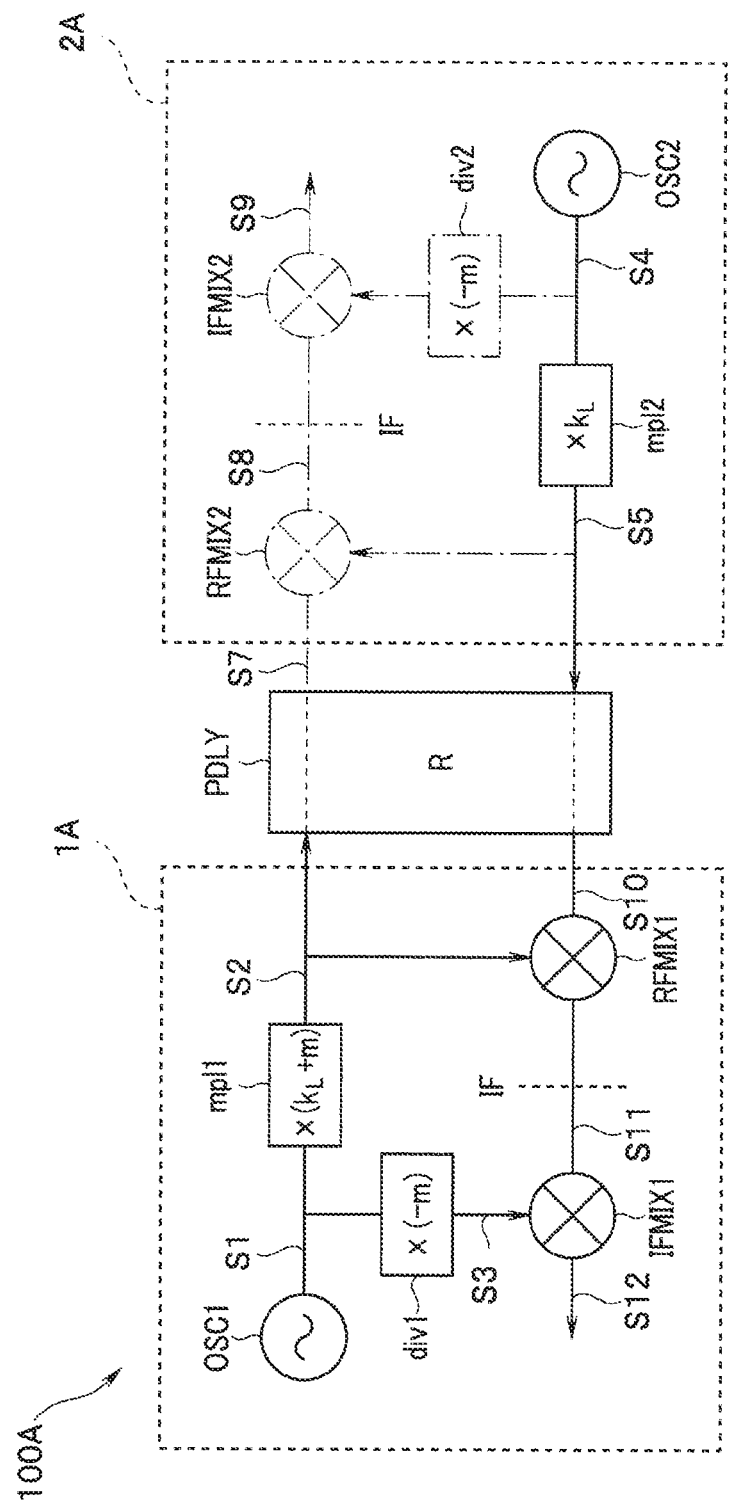
FIG. 4 is a configuration diagram of a radio circuit of a distance measuring system for describing a phase detected from a distance measuring signal transmitted from the other of two devices.

A description will be given below with reference to FIG. 4 with respect to phase information detected by the device 1A from the second distance measuring signal of the frequency $k_L f_{x2}$ received by the device 1A and transmitted from the device 2A. FIG. 4 is a configuration diagram of the radio circuit of the distance measuring system for describing a phase detected from the distance measuring signal transmitted from the other of the two devices. In FIG. 4, the div2, the RFMIX2, and the IFMIX2 have no relation to the operation and are indicated by one-dot chain lines. A phase of a signal S10, which is the second measuring signal, after passing through the propagation path PDLY is expressed by Equation (12) as follows.

$$\phi_{rx1} = 2\pi k_L f_{x2}(t - \tau_R) + \theta_{Lx2} \quad (12)$$

Here, the $\tau_R$ represents a delay time of the propagation path. The signal S10, which is the second distance measuring signal, is subjected to frequency conversion by the output signal S2 of the mpl1, and a phase of an output signal S11 of the RFMIX1 is expressed by Equation (13) as follows.

$$\phi_{ifx1}(t) = 2\pi k_L(f_{x2} - f_{x1})t - 2\pi m f_{x1} t + (\theta_{Lx2} - \theta_{Lmx1}) - 2\pi k_L f_{x2} \tau_R \quad (13)$$

Here, the result of extraction of only a desired signal is indicated. The output signal S11 is subjected to frequency conversion by the output signal S3 of the div1, and a phase of an output signal S12 of the IFMIX1 detected by the device 1A is expressed by Equation (14) as follows.

$$\phi_{BB1L}(t) = 2\pi k_L(f_{x2} - f_{x1})t + (\theta_{Lx2} - \theta_{Lmx1}) - \theta_{Bx1} - 2\pi k_L f_{x2} \tau_R \quad (14)$$

Here, the result of desired quadrature demodulation is described.

Since the transmission signals of the device 1A and the device 2A, that is, the first distance measuring signal and the second distance measuring signal, are generally assumed to have the (substantially) identical frequency, a relation of Equation (15) is established as follows.

$$f_{x1} \approx f_{x2} \quad (15)$$

Here, since the first distance measuring signal and the second distance measuring signal are generally assumed to have the identical frequency for the sake of ideality or simplicity, a relation of Equation (16) is established as follows.

$$f_{x1} = f_{x2} \quad (16)$$

In this case, the phase $\phi_{BB1L}(t)$ of the signal S10, which is the second distance measuring signal detected by the device 1A, and the phase $\phi_{BB2L}(t)$ of the first distance measuring signal S7 detected by the device 2A are expressed by Equations (17) and (18) as follows, respectively.

$$\phi_{BB1L}(t) = (\theta_{Lx2} - \theta_{Lmx1}) - \theta_{Bx1} - 2\pi k_L f_{x1} \tau_R \quad (17)$$

$$\phi_{BB2L}(t) = (\theta_{Lx1} - \theta_{Lmx2}) - \theta_{Bx2} - 2\pi k_L f_{x1} \tau_R \quad (18)$$

When the distance between the device 1A and the device 2A is defined as R and a speed of light is defined as c, Equation (19) is obtained as follows from a relation of $\tau_R = R/c$ and Equations (17) and (18).

$$R = -\frac{c(\phi_{BB1L}(t) + \phi_{BB2L}(t))}{4\pi k_L f_{x1}} + \frac{c(\theta_{Lx1} + \theta_{Lx2} - \theta_{Lmx1} - \theta_{Lmx2} - \theta_{Bx1} - \theta_{Bx2})}{4\pi k_L f_{x1}} \quad (19)$$

A first term of Equation (19) represents an arithmetic operation of the phases observed by the device 1A and the device 2A and existing information, while a second term includes information on the initial phases of the mpl1, the mpl2, the div1, and the div2, the information not being observed. Accordingly, accurate distance measurement can hardly be performed using the phase result detected when the device 1A and the device 2A transmit the distance measuring signal of the identical frequency, that is, when the distance measuring signal of the frequency $k_H f_{x1}$ is reciprocated. The reason is because the initial phase changes at the time of transmission and reception.

Figure 5:
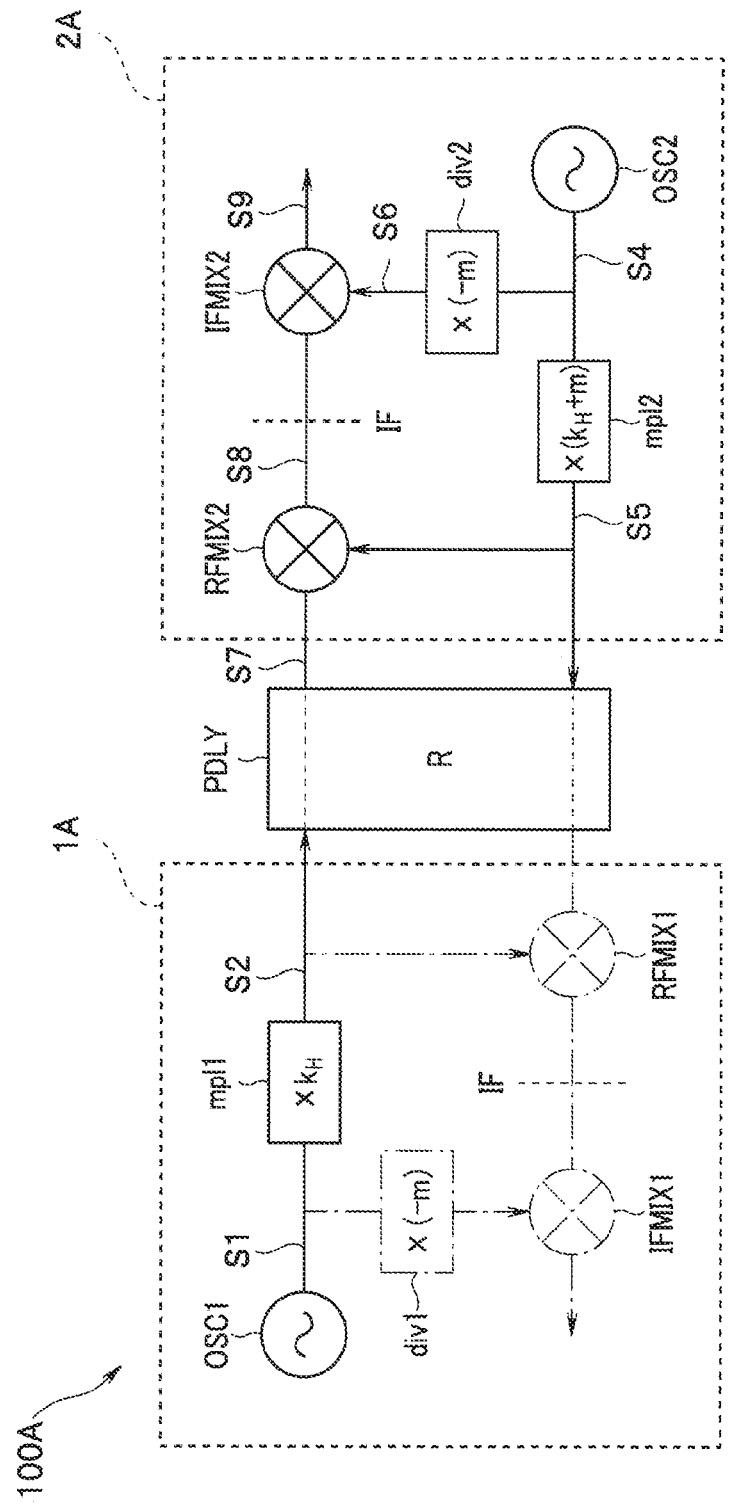
FIG. 5 is a configuration diagram of a radio circuit of a distance measuring system for describing a phase detected from a distance measuring signal transmitted from one of two devices due to a change of a frequency.

The frequency of the distance measuring signal can be changed from $k_L f_{x1}$ into $k_H f_{x1}$ when the frequency multiplication factor of the mpl1 and the mpl2 in FIG. 3 is changed from $k_L$ into $k_H$. In this case, the initial phases of the mpl1 and the mpl2 are also changed depending on the change of the frequency. FIG. 5 is a configuration diagram of the radio circuit of the distance measuring system for describing a phase detected from a distance measuring signal transmitted from one of the two devices due to the change of the frequency. FIG. 5 is a diagram of a case where a first distance measuring signal is transmitted from the device 1A to the device 2A, and a phase of an output signal S2 of the mpl1 and a phase of an output signal S5 of the mpl2 are expressed by Equations (20) and (21) as follows, respectively.

$$\phi_{tx1} = 2\pi k_H f_{x1} t + \theta_{Hx1} \quad (20)$$

$$\phi_{tx2} = 2\pi (k_H + m) f_{x2} t + \theta_{Hmx2} \quad (21)$$

Figure 6:
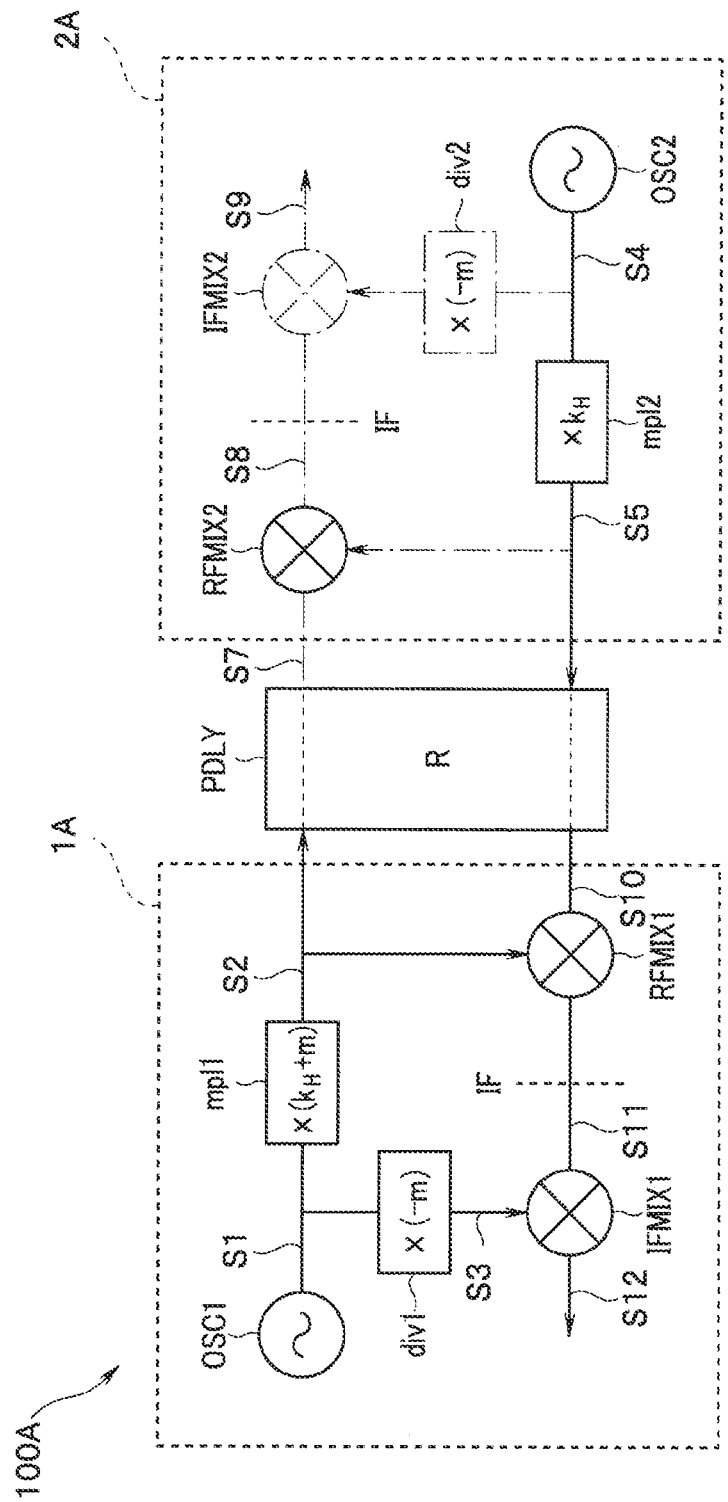
FIG. 6 is a configuration diagram of a radio circuit of a distance measuring system for describing a phase detected from a distance measuring signal transmitted from the other of two devices due to a change of a frequency.

Similarly, the frequency of the first distance measuring signal can be changed from $k_L f_{x1}$ into $k_H f_{x1}$ when the frequency multiplication factor of the mpl1 and the mpl2 in FIG. 4 is changed from $k_H$ into $k_L$. In this case, the initial phases of the mpl1 and the mpl2 are also changed depending on the change of the frequency. FIG. 6 is a configuration diagram of the radio circuit of the distance measuring system for describing a phase detected from a distance measuring signal transmitted from the other of the two devices due to the change of the frequency. FIG. 6 is a diagram of a case where a distance measuring signal is transmitted from the device 2A to the device 1A, and a phase of an output signal S2 and a phase of an output signal S5 are expressed by Equations (22) and (23) as follows, respectively.

$$\phi_{tx1} = 2\pi (k_H + m) f_{x1} t + \theta_{Hmx1} \quad (22)$$

$$\phi_{tx2} = 2\pi k_H f_{x2} t + \theta_{Hx2} \quad (23)$$

For simplicity, the analysis proceeds using the relation of $f_{x1} = f_{x2}$ as expressed in Equation (16). In the case of the frequency $k_H f_{x1}$ of the distance measuring signal, the phase $\phi_{BB1H}(t)$ of the signal S10 which is the second distance measuring signal detected by the device 1A and the phase $\phi_{BB2H}(t)$ of the first distance measuring signal S7 detected by the device 2A are obtained, and are expressed by Equations (24) and (25) as follows, respectively.

$$\phi_{BB1H}(t) = (\theta_{Hx2} - \theta_{Hmx1}) - \theta_{Bx1} - 2\pi k_H f_{x1} \tau_R \quad (24)$$

$$\phi_{BB2H}(t) = (\theta_{Hx1} - \theta_{Hmx2}) - \theta_{Bx2} - 2\pi k_H f_{x1} \tau_R \quad (25)$$

From Equations (17), (18), (24), and (25), Equation (26) can be obtained as follows.

$$R = -\frac{c(\phi_{BB1H}(t) + \phi_{BB2H}(t) - \phi_{BB1L}(t) - \phi_{BB2L}(t))}{4\pi(k_H - k_L)f_{x1}} + \frac{c(\theta_{Hx1} + \theta_{Hx2} - \theta_{Hmx1} - \theta_{Hmx2} - \theta_{Lx1} - \theta_{Lx2} + \theta_{Lmx1} + \theta_{Lmx2})}{4\pi(k_H - k_L)f_{x1}} \quad (26)$$

Accordingly, even when two distance measuring signals of the frequency $k_L f_{x1}$ and the frequency $k_H f_{x1}$ reciprocate, accurate distance measurement can hardly be performed using the detected phase information. As described above, the reason is because the initial phase changes at the time of transmission and reception of the device 1A and the device 2A. Even when a difference between two types of phase information obtained due to the change of the frequency is calculated, the initial phase is not canceled out.

A distance measuring system according to the present embodiment, which achieves accurate distance measurement, will be described below. The distance measuring system has a configuration in which a VCO direct modulation method is used for a transmitting unit and an SH method is used for a receiving unit.

Figure 7:
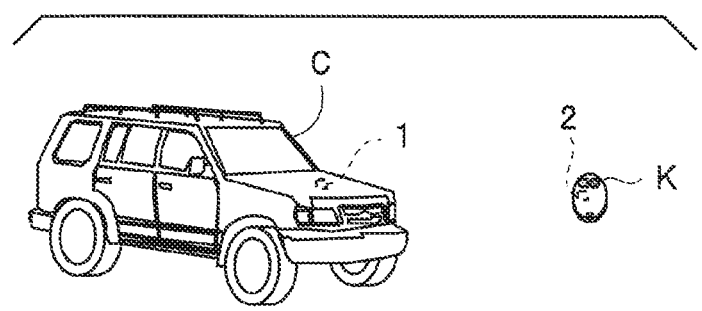
FIG. 7 is a configuration diagram for describing a smart key system to which a distance measuring system according to a first embodiment is applied.

FIG. 7 is a configuration diagram for describing a smart key system to which the distance measuring system according to the present embodiment is applied. A distance measuring system 100 includes a device 1 and a device 2. At least one of the device 1 and the device 2 is movable. The distance measuring system 100 calculates a distance between the device 1 and the device 2 based on carrier phase detection. One of the device 1 and the device 2 includes a calculation unit that calculates the distance between the device 1 and the device 2 based on phase information acquired by the device 1 and the device 2.

A smart key system for locking and unlocking of a car C includes the car C and a key K that is used to lock and unlock the doors and to start the engine of the car C. More specifically, the smart key system performs radio communication between a device 1 mounted on the car C and a device 2 built in the key K according to a predetermined protocol, and makes locking of the doors and the like possible when the key K is correctly authenticated in the car.

Figure 8:
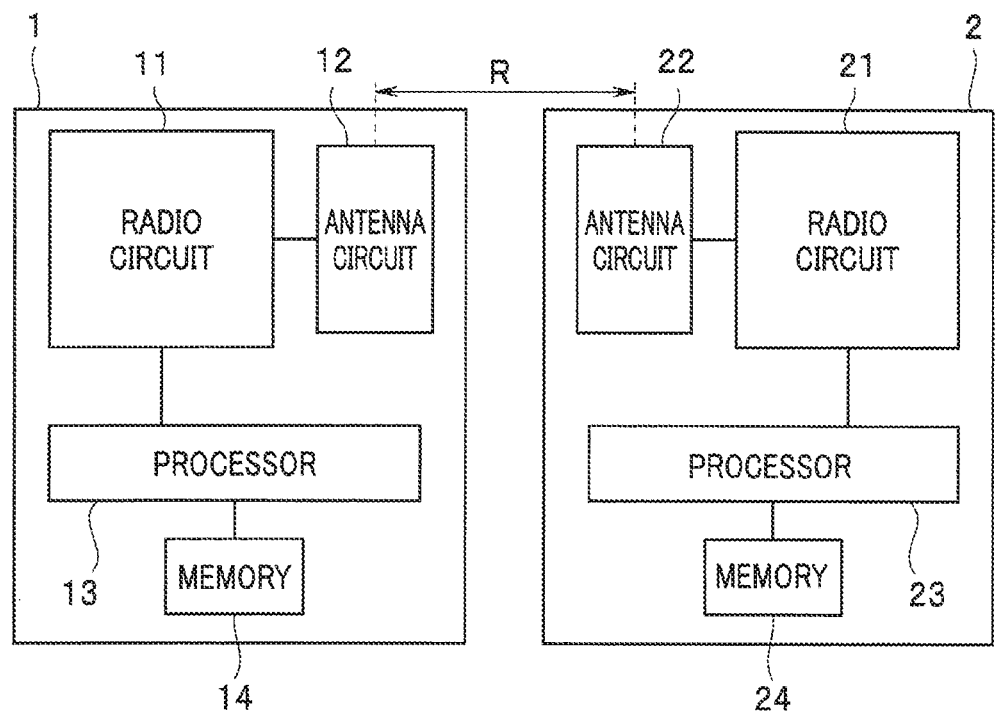
FIG. 8 is a block diagram illustrating configurations of two devices according to the first embodiment.

FIG. 8 is a block diagram illustrating configurations of the device 1 and the device 2. The device 1 and the device 2 are separated from each other by a distance R. The distance R corresponds to a distance between a user of the car C holding the key K and the car C, for example.

The device 1 includes a radio circuit 11, an antenna circuit 12, a processor 13, and a memory 14. Similarly, the device 2 includes a radio circuit 21, an antenna circuit 22, a processor 23, and a memory 24.

The radio circuits 11 and 21 include circuits that are used to transmit and receive various radio signals such as beacon signals to be described below. Furthermore, the radio circuits 11 and 21 include circuits that are used to transmit and receive distance measuring signals. A configuration of circuits for distance measurement will be described below.

The antenna circuits 12 and 22 include one or more antennas, and can transmit transmission waves depending on transmission signals from the radio circuits 11 and 21, respectively. In addition, the antenna circuits 12 and 22 receive transmission waves from the antenna circuits 22 and 12 and supply the received signals to the radio circuits 11 and 21, respectively.

The processors 13 and 23 control the radio circuits 11 and 21, respectively. The processors 13 and 23 are configured to implement predetermined functions by reading and executing software stored in the memories 14 and 24 using a central processing unit (CPU), respectively. Each of the processors 13 and 23 may be configured by an electronic circuit including a semiconductor device.

The processor 13 of the device 1 controls the radio circuit 11 to transmit a beacon signal at a predetermined cycle. When the processor 23 of the device 2 receives the beacon signal via the radio circuit 21, the processor 23 transmits a predetermined signal and controls the radio circuit 21 to perform communication between the devices 1 and 2. Authentication is performed through such communication, and when the authentication is successful, the processor 13 of the device 1 notifies a control device (not illustrated) of the car C that the authentication has succeeded. As a result, the doors can be unlocked and the engine can also be started.

In the present embodiment, the distance R between the devices 1 and 2 is measured for relay attack countermeasures. Therefore, even when the authentication is successful, the doors of the car C can be controlled so that the doors cannot be unlocked when the distance R is not less than a predetermined distance value. In other words, the distance R between the car C and the key K is measured after the authentication described above. When it is determined that the distance R is equal to or greater than the predetermined distance value, the control device of the car C can take a process of prohibiting the unlocking of the doors so that the doors of the car C cannot be unlocked.

The phase information detected by one of the device 1 and the device 2 is transmitted to the other of the device 1 and the device 2, and the distance R is calculated in the other device. Here, the device 1 of the car C calculates the distance R using the phase information detected by the device 1 and the phase information received from the device 2. Therefore, the processor 13 of the device 1 includes a calculation unit that calculates the distance R. When the distance R is equal to or greater than the predetermined value, the control device of the car C can take a process of prohibiting the unlocking of the doors so that the doors of the car C cannot be unlocked.

A transmitting unit in a transceiver of each of the device 1 and the device 2 has a configuration in which the output signal of the voltage controlled oscillator (VCO) is directly modulated, and a receiving unit in the transceiver of each of the device 1 and the device 2 has a configuration with a heterodyne method or a Low-IF method.

The devices 1 and 2 have mutually independent reference signals. In order to measure the distance between the device 1 and the device 2, a radio unit architecture configuration is advantageous herein in terms of low power consumption. In the radio unit architecture configuration, the respective devices 1 and 2 use the VCO direct modulation method for the transmitting unit and use the SH method for the receiving unit. In such a configuration, the first distance measuring signal is sent from the device 1 to the device 2, the second distance measuring signal is sent from the device 2 to the device 1, and the distance R is measured based on the phase information detected by the device 1 and the device 2. A plurality of distance measuring signals transmitted from the device 1 to the device 2 are defined as a first carrier group, and distance measuring signals transmitted from the device 2 to the device 1 are defined as a second carrier group. Here, the term "carrier group" uses two or more waves, the effect of which will be described below. In the following example, two waves will be described for simplicity. In addition, as will be described below, the distance measuring signals having a predetermined frequency included in the first carrier group and the second carrier group do not necessarily exist at the same time, and may be transmitted and received one by one in time series between the device 1 and the device 2. However, the embodiment will be described herein without considering time-series signal exchange.

Figure 9:
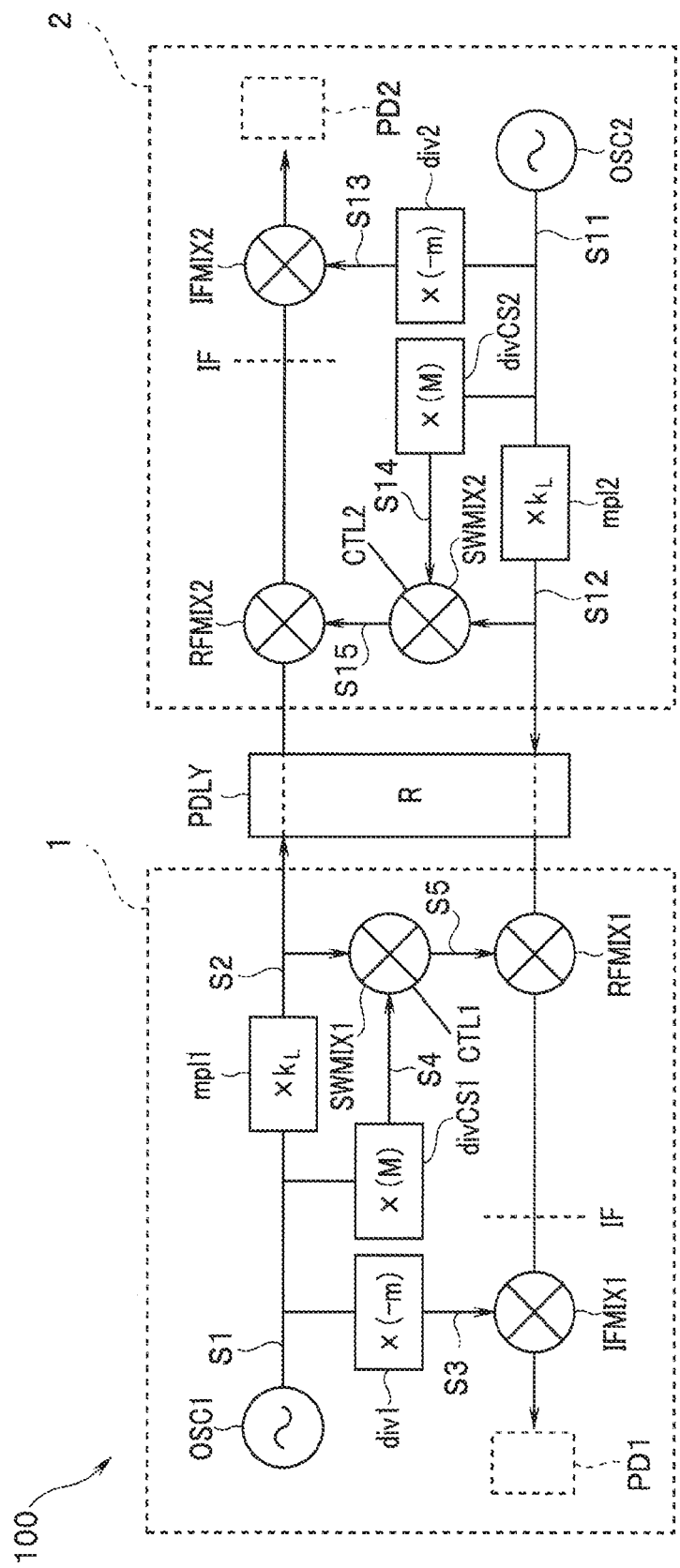
FIG. 9 is a configuration diagram of a radio circuit of a distance measuring system according to the first embodiment in which a distance between two devices is measured.

The configurations of the radio circuits in the devices 1 and 2 will be described below. In FIG. 9 and the like as will be described below, only the radio circuit related to the distance measurement is illustrated, and only the processing related to the distance measurement will be described. The device 1 is mounted on the car C, and the device 2 is built in the key K.

FIG. 9 is a configuration diagram of the radio circuit of the distance measuring system according to the present embodiment in which the distance between the two devices is measured. Since circuits illustrated in FIG. 9 and subsequent drawings have configurations substantially similar to the configurations of the circuits illustrated in FIGS. 1 to 6, the identical components are denoted by the identical reference numerals and will not be described, and different components will be described.

The distance measuring system 100 includes the device 1 and the device 2. The device 1 transmits a first distance measuring signal, and the device 2 transmits a second distance measuring signal. The first and second distance measuring signals reach the device 2 and the device 1, respectively, via a propagation path PDLY between the device 1 and the device 2. Each of the device 1 and the device 2 includes the radio circuit using a low power consumption VCO direct modulation method for the transmitting unit and a low power consumption SH method for the receiving unit. The device 1 and the device 2 include mutually independent reference signal sources, respectively. The distance between the device 1 and the device 2 is measured based on the phase information detected by the device 1 and the device 2.

FIG. 9 illustrates the configuration of the radio circuit simplified in the device 1 and the device 2. The device 1 includes an OSC1 that is a device-specific oscillator 1, an mpl1 that is a frequency multiplier, an RFMIX1 that is an RF frequency converter, a div that is a frequency divider, an IFMIX1 that is an IF frequency converter, a reception frequency divider divCS1, and a reception local-oscillation frequency converter SWMIX1. The device 2 also has a radio architecture similar to the device 1, includes an OSC2 that is a device-specific oscillator 2, an mpl2 that is a frequency multiplier, an RFMIX2 that is an RF frequency converter, a div2 that is a frequency divider, an IFMIX2 that is an IF frequency converter, a reception frequency divider divCS2, and a reception local-oscillation frequency converter SWMIX2.

A transceiver of the device 1 includes a phase detector PD1 (indicated by a dotted line) that detects a phase of a second carrier signal, and a transceiver of the device 2 includes a phase detector PD2 (indicated by a dotted line) that detects a phase of a first carrier signal.

FIG. 9 is different from FIGS. 1 and 2 in that the device 1 additionally includes the reception frequency divider divCS1 and the reception local-oscillation frequency converter SWMIX1 and the device 2 additionally includes the reception frequency divider divCS2 and the reception local-oscillation frequency converter SWMIX2.

Furthermore, the difference between FIG. 9 and FIGS. 1 and 2 is that the frequency multiplication factors of the mpl1 and the mpl2 are not changed at the time of transmission and reception.

The mpl1, the RFMIX1, the div1, the IFMIX1, the divCS1, and the SWMIX1 configure the transceiver of the device 1. The transceiver of the device 1 transmits two or more first carrier signals and receives two or more second carrier signals using the output of the OSC1. The mpl2, the RFMIX2, the div2, the IFMIX2, the divCS2, and the SWMIX2 configure the transceiver of the device 2. The transceiver of the device 2 transmits two or more second carrier signals and receives two or more first carrier signals using the output of the OSC2. A frequency group of two or more first carrier signals and a frequency group of two or more second carrier signals are identical to each other, or are substantially identical to each other because a reference signal source of the first carrier signal and a reference signal source of the second carrier signal are different from each other.

The SWMIX1 includes a control terminal CTL1. A control signal to the control terminal CTL1 controls the CTL1 as to whether to operate the SWMIX1 or to substantially input directly an output signal S2 to the RFMIX1 without operating the SWMIX1. A control signal is input to the control terminal CTL1 from the processor 13.

In other words, the device 1 includes the SWMIX1 serving as an LO signal generation unit that generates a frequency obtained by adding or subtracting a predetermined divided frequency of a reference frequency of the OSC1 and a transmission frequency set using PLL, and an RF mixer (RFMIX1) that receives an output of the SWMIX1 as an LO input in order to convert the received signal into an intermediate frequency (IF).

The SWMIX2 includes a control terminal CTL2. A control signal to the control terminal CTL2 controls the CTL2 as to whether to operate the SWMIX2 or to substantially input directly an output signal S12 to the RFMIX2 without operating the SWMIX2. A control signal from the processor 23 is input to the control terminal CTL2.

In other words, the device 2 includes the SWMIX2 serving as an LO signal generation unit that generates a frequency obtained by adding or subtracting a predetermined divided frequency of a reference frequency of the OSC2 and a transmission frequency set using PLL, and an RF mixer (RFMIX2) that receives an output of the SWMIX2 as an LO input in order to convert the received signal into an intermediate frequency (IF).

Figure 10:
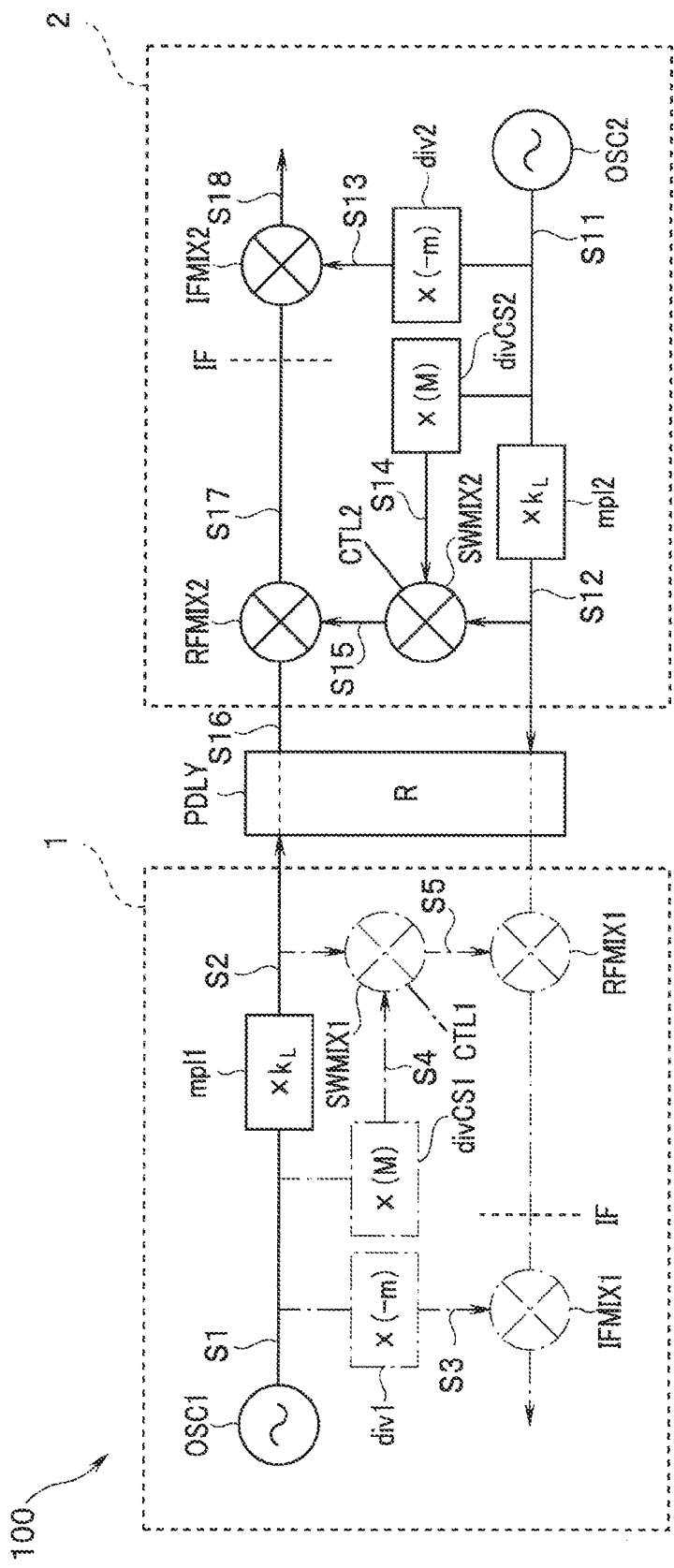
FIG. 10 is a configuration diagram of a radio circuit of the distance measuring system according to the first embodiment for describing a flow of signal processing until one wave of a first carrier group is transmitted from one of two devices to the other device and a phase is detected by the other of the two devices.

In order to describe that the distance measurement can be performed by the configuration of the radio unit according to the present embodiment, a case is considered in which one wave of the first carrier group is transmitted from the device 1 to the device 2 and one wave of the second carrier group is transmitted from the device 2 to the device 1. In other words, accurate distance measurement can be performed without the change in initial phases of the mpl1 and the mpl2 even when a two way of the distance measuring signal is performed between the device 1 and the device 2. First, an interchange of low-frequency distance measuring signals will be described. In this case, a frequency of one wave of the first carrier group transmitted from the device 1 to the device 2 is $k_L f_{x1}$, and a frequency of one wave of the second carrier group transmitted from the device 2 to the device 1 is $k_L f_{x2}$. FIG. 10 illustrates a flow of signal processing until one wave of the first carrier group is transmitted from the device 1 to the device 2 and an output phase is detected by the device 2.

FIG. 10 is a configuration diagram of the radio circuit of the distance measuring system for describing the flow of signal processing until one wave of the first carrier group is transmitted from the device 1 to the device 2 and the phase is detected by the device 2. In FIG. 10, the div1, the RFMIX1, the IFMIX1, the divCS1, and the SWMIX1 have no relation to the operation and are indicated by one-dot chain lines.

Since a phase of an output signal S1 of the OSC1 and a phase of an output signal of the mpl1 are expressed by Equations (1) and (2), respectively, a phase of a signal S16 after passing through the propagation path PDLY is expressed by Equation (27) as follows.

$$\phi_{rx2} = 2\pi k_L f_{x1}(t-\tau_R) + \theta_{Lx1} \qquad (27)$$

Here, the $\tau_R$ represents a delay time of the propagation path. A signal obtained by multiplying an output signal S12 of the mpl2 and an output signal S14 of the reception frequency divider divCS2 is used as a local oscillation (LO) signal S15 input to the RFMIX2. A phase of the output signal S12 of the mpl2 is expressed by Equation (6) as described above. The divCS2 multiplies the output frequency of the OSC2 by M, and a phase of the output signal S14 is expressed by Equation (28) as follows.

$$\phi_{of2}=M2\pi f_{x2}t+\theta_{Fx2} \quad (28)$$

Here, the $\theta_{Fx2}$ represents an initial phase of the output signal S14. Further, since the reception local-oscillation frequency converter SWMIX2 generates a local oscillation signal having no image, for example, when a quadrature modulator is used, a phase of the output signal S15 is expressed by Equation (29) as follows.

$$\phi_{mL2}=2\pi(k_L+M)f_{x2}t+\theta_{Lx2}+\theta_{Fx2} \quad (29)$$

The output signal S16 is subjected to frequency conversion by the signal 515, and a phase of an output signal S17 of the RFMIX2 is expressed by Equation (30) as follows.

$$\phi_{ifx2}(t)=2\pi k_L(f_{x1}-f_{x2})t-2\pi Mf_{x2}t+(\theta_{Lx1}-\theta_{Lx2}-\theta_{Fx2})-2\pi k_Lf_{x1}\tau_R \quad (30)$$

Here, the result of extraction of only a desired signal is indicated. The signal S17 is subjected to frequency conversion by the signal S13 expressed by Equation (4) described above, and a phase of an output signal S18 detected by the device 2 is expressed by Equation (31) as follows.

$$\phi_{BB2L}(t)=2\pi k_L(f_{x1}-f_{x2})t-2\pi(M-m)f_{x2}t+(\theta_{Lx1}-\theta_{Lx2}-\theta_{Fx2})-\theta_{Bx2}-2\pi k_Lf_{x1}\tau_R \quad (31)$$

Here, the result of desired quadrature demodulation is described.

Figure 11:
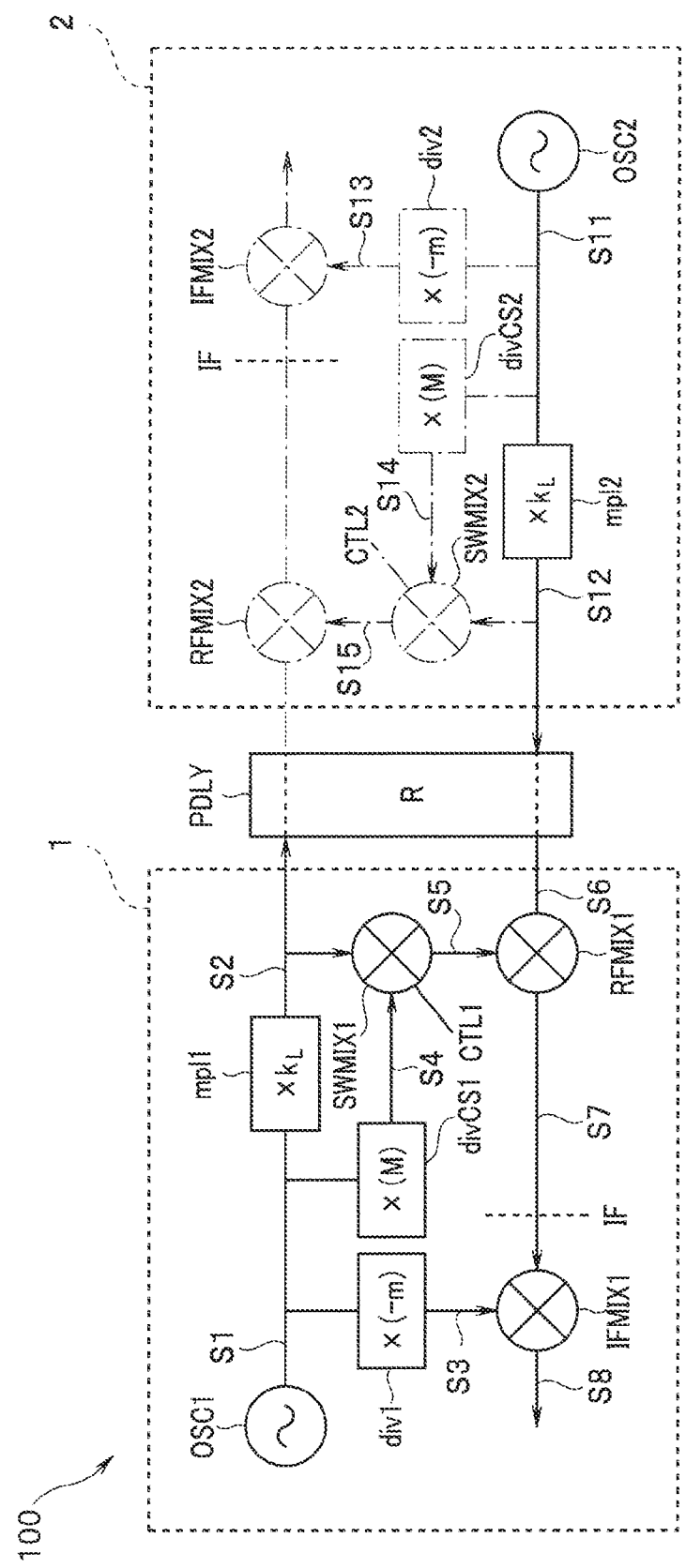
FIG. 11 is a configuration diagram of a radio circuit of the distance measuring system according to the first embodiment for describing a flow of signal processing until one wave of a second carrier group is transmitted from the other of two devices to one device and a phase is detected by one of the two devices.

Next, FIG. 1 illustrates a flow of signal processing until one wave of the second carrier group is transmitted from the device 2 to the device 1 and an output phase is detected by the device 1. FIG. 11 is a configuration diagram of the radio circuit of the distance measuring system for describing the flow of signal processing until one wave of the second carrier group is transmitted from the device 2 to the device 1 and the phase is detected by the device 1. In FIG. 11, the div2, the RFMIX2, the IFMIX2, the divCS2, and the SWMIX2 have no relation to the operation and are indicated by one-dot chain lines. Since a phase of an output signal S1 of the OSC2 and a phase of an output signal S12 of the mpl2 are expressed by Equations (5) and (6) described above, respectively, a phase of the signal S6 after passing through the propagation path PDLY is expressed by Equation (32) as follows.

$$\phi_{rx1}=2\pi k_Lf_{x2}(t-\tau_R)+\theta_{Lx2} \quad (32)$$

Here, the $\tau_R$ represents a delay time of the propagation path. A signal obtained by multiplying an output signal S2 of the mpl1 and an output signal S4 of the reception frequency divider divCS1 is used as a local oscillation (LO) signal S5 input to the RFMIX1. A phase of the output signal S2 of the mpl1 is expressed by Equation (2) as described above. The divCS1 multiplies the output frequency of the OSC1 by M, and a phase of the output signal S4 is expressed by Equation (33) as follows.

$$\phi_{of1}=M2\pi f_{x1}t+\theta_{Fx1} \quad (33)$$

Here, the $\theta_{Fx1}$ represents an initial phase of the output signal S4. Since the reception local-oscillation frequency converter SWMIX1 generates a local oscillation signal having no image, for example, when a quadrature modulator is used, a phase of the output signal S5 is expressed by Equation (34) as follows.

$$\phi_{mL1}=2\pi(k_L+M)f_{x1}t+\theta_{Lx1}+\theta_{Fx1} \quad (34)$$

The output signal S6 is subjected to frequency conversion by the signal S5, and a phase of an output signal S7 of the RFMIX1 is expressed by Equation (35) as follows.

$$\phi_{ifx1}(t)=2\pi k_L(f_{x2}-f_{x1})t-2\pi Mf_{x1}t+(\theta_{Lx2}-\theta_{Lx1}-\theta_{Fx1})-2\pi k_Lf_{x2}\tau_R \quad (35)$$

Here, the result of extraction of only a desired signal is indicated. The signal S7 is subjected to frequency conversion by the signal S3 expressed by Equation (8) described above, and a phase of a signal S8 detected by the device 1 is expressed by Equation (36) as follows.

$$\phi_{BB1L}(t)=2\pi k_L(f_{x2}-f_{x1})t-2\pi(M-m)f_{x1}t+(\theta_{Lx2}-\theta_{Lx1}-\theta_{Fx1})-\theta_{Bx1}-2\pi k_Lf_{x2}\tau_R \quad (36)$$

Here, the result of desired quadrature demodulation is described. When Equation (31) and Equation (36) are added, Equation (37) is obtained as follows.

$$\phi_{BB1L}(t)+\phi_{BB2L}(t)=2\pi(m-M)(f_{x1}+f_{x2})t-(\theta_{Fx1}+\theta_{Fx2})-(\theta_{Bx1}+\theta_{Bx2})-2\pi k_L(f_{x1}+f_{x2})\tau_R \quad (37)$$

A third term on the right-hand side of Equation (37) represents the addition of the initial phases of the div1 and the div2 in the device 1 and the device 2, a second term on the right-hand side represents the addition of the initial phases of the divCS1 and the divCS2 in the device 1 and the device 2, and the third and second terms are independent and undetectable. Thus, phase uncertainty exists in Equation (37), and accurate distance calculation cannot be performed as it is.

Next, when the transmission frequencies of the device 1 and the device 2 are set to $k_Hf_{x1}$ and $k_Hf_{x2}$, respectively, the phase signal detected by the device 2 is obtained when the distance measuring signal is transmitted from the device 1 to the device 2 in the same manner as described above. In FIG. 10, $k_L$ is replaced with $k_H$, and accordingly, $\theta_{Lx1}$ is replaced with $\theta_{Hx1}$ and $\theta_{Lx2}$ is replaced with $\theta_{Hx2}$. At this time, the phase of the distance measuring signal detected by the device 2 is expressed by Equation (38) as follows.

$$\phi_{BB2H}(t)=2\pi k_H(f_{x1}-f_{x2})t-2\pi(M-m)f_{x2}t+(\theta_{Hx1}-\theta_{Hx2}-\theta_{Fx2})-\theta_{Bx2}-2\pi k_Hf_{x1}\tau_R \quad (38)$$

Similarly, when the distance measuring signal is transmitted from the device 2 to the device 1, the phase detected by the device 1 is obtained. In FIG. 11, $k_L$ is replaced with $k_H$, and accordingly, $\theta_{Lx1}$ is replaced with $\theta_{Hx1}$ and $\theta_{Lx2}$ is replaced with $\theta_{Hx2}$. At this time, the phase of the distance measuring signal detected by the device 2 is expressed by Equation (39) as follows.

$$\phi_{BB1H}(t)=2\pi k_H(f_{x2}-f_{x1})t-2\pi(M-m)f_{x1}t+(\theta_{Hx2}-\theta_{Hx1}-\theta_{Fx1})-\theta_{Bx1}-2\pi k_Hf_{x2}\tau_R \quad (39)$$

Equation (40) is obtained as follows by addition of Equation (38) and Equation (39).

$$\phi_{BB1H}(t)+\phi_{BB2H}(t)=2\pi(m-M)(f_{x1}+f_{x2})t-(\theta_{Fx1}+\theta_{Fx2})-(\theta_{Bx1}+\theta_{Bx2})-2\pi k_H(f_{x1}+f_{x2})\tau_R \quad (40)$$

A second term on the right-hand side of Equation (40) represents the addition of the initial phases of the div1 and the div2 in the device 1 and the device 2, a third term on the right-hand side represents the addition of the initial phases of the divCS1 and the divCS2 in the device 1 and the device 2, and the second and third terms are independent and undetectable. Thus, phase uncertainty exists in Equation (40), and accurate distance calculation cannot be performed as it is.

However, the div1, the div2, the divCS1, and the divCS2 in the device 1 and the device 2 are always operating during distance measurement, and the initial phases of the div1, the div2, the divCS1, and the divCS2 are fixed during distance measurement. As will be described below, it is effective, for example, to subtract the phase result detected at two frequencies in order to increase the folding distance caused by the phase distance measurement. By such an operation, the initial phase fixed at the time of distance measurement can be canceled out. In other words, when the difference between Equation (37) and Equation (40) is taken, Equation (41) is obtained as follows.

$$\phi_{BB1L}(t)+\phi_{BB2L}(t)-(\phi_{BB1H}(t)+\phi_{BB2H}(t))=2\pi(k_H-k_L)(f_{x1}+f_{x2})\tau_R \quad (41)$$

The left-hand side represents a phase result detected by the device 1 and the device 2, and the right-hand side represents the product of set frequency information and delay time. Equation (42) is obtained as follows from transformation of Equation (41).

$$\tau_R = \frac{\phi_{BB1L}(t)+\phi_{BB2L}(t)-(\phi_{BB1H}(t)-\phi_{BB2H}(t))}{2\pi(k_H-k_L)(f_{x1}+f_{x2})} \quad (42)$$

Equation (43) is obtained from the relation of $R = c \times \tau_R$.

$$R = c \times \frac{\phi_{BB1L}(t)+\phi_{BB2L}(t)-(\phi_{BB1H}(t)-\phi_{BB2H}(t))}{2\pi(k_H-k_L)(f_{x1}+f_{x2})} \quad (43)$$

The arithmetic operation of Equation (43) described above is performed herein in the device 1. More specifically, information on the phase detected by the device 2 is transmitted to the device 1, and the processor 13 of the device 1 configures a calculation unit that calculates the distance R based on the phase detection result obtained by reception of the first and second carrier signals.

The phase information of the two first carrier signals detected by the device 2 is separately transmitted from the device 2 to the device 1 by generation of an IQ signal including the phase information, for example.

The reason why the initial phases of the device 1 and the device 2 have been canceled out by the configuration of the radio unit described above will be described below. The initial phases are also changed by the change of the frequency multiplication factors of the mpl1 and the mpl2 from Equations (2) and (7), but the change of the initial phases independently depends on the frequency setting value.

However, according to the above-described configuration, when the distance measuring signals of the identical frequency are exchanged between the device 1 and the device 2, the multiplication factors of the mpl1 and the mpl2 are constant without being changed during transmission and reception.

The frequency setting is changed during the reception by multiplying the output signals of the divCS1 and the divCS2 by the output signals of the mpl1 and the mpl2. Here, since the divCS1 and the divCS2 continue to operate without stopping during the distance measurement, a fixed initial phase exists. The initial phase is canceled out by the distance measurement of the distance extension by two frequencies.

In a denominator of Equation (43), the $(k_H-k_L)$ has a meaning of increasing the detection distance. In other words, when the distance measurement is performed in one reciprocation of transmission and reception, the frequency setting is either $k_H$ or $k_L$. In this case, the denominator becomes $2\pi k_H(f_{x1}+f_{x2})$ or $2\pi k_L(f_{x1}+f_{x2})$. The $k_H$ and the $k_L$ are not identical but are in the relation of $k_H \approx k_L$. Thus, a detection range of the distance R can be greatly expanded. The existence of such a distance detection range is due to the fact that the phase has a periodicity of $2\pi$. When the frequency is further increased and, for example, the frequency setting of $k_M$ is added, distance detection by the frequency settings $k_L$ and $k_H$, distance detection by the frequency settings $k_L$ and $k_M$, and distance detection by the frequency settings $k_H$ and $k_M$ are obtained. The identical distance is obtained in each case, but since the frequency difference is different, the phase difference results related to the distance are different. In other words, a plurality of distances including the folding distance estimated from the respective phase detection results are calculated, and a matching distance under three frequency conditions is a distance to be obtained. Thus, the probability of erroneous determination of the distance due to the folding effect can be significantly reduced. Hence, the probability of calculating the accurate distance is increased using a large number of frequencies.

In addition, phase deviation due to multipath is averaged using a large number of frequencies, and accurate distance can be estimated.

Time differences among signals in Equations (31), (36), (38), and (39) are not considered, so the result of Equation (43) corresponds to simultaneous transmission and reception of four waves. In FIGS. 9, 10, and 11, each of the device 1 and the device 2 includes one transmitting and receiving unit, but Equation (43) requires that the each of the device 1 and the device 2 has a transmitting and receiving unit of two systems. A time-division transmission and reception sequence is required to operate the transmitting and receiving unit of one system in the device 1 and the device 2. The sequence will be described below.

As described above, in order to prevent deterioration of the distance measurement accuracy, the initial phase of the transmitting unit and the initial phase of the receiving unit included in the distance measuring signal detected by the device 1 and the device 2 are associated with each other so as not to be set independently, and thus the initial phase of the transmitting unit and the initial phase of the receiving unit are canceled out.

In the present embodiment, the local oscillation signal generated by the receiving unit is generated by multiplying the output signal of the transmitting unit by the frequency-divided signal of the reference oscillator which is constantly operating during the distance measurement, and the initial phase of the transmitting unit and the initial phase of the receiving unit of the device 1 and the device 2 are partially canceled out by adding the phases of the distance measuring signals detected by the respective device 1 and the device 2. In the present embodiment, the distance measuring signals using at least two frequencies are detected by the device 1 and the device 2, and the distance is obtained from the difference between two additional values of the two phases detected by the two devices.

As described above, according to the above-described embodiment, it is possible to provide the distance measuring device and the distance measuring method capable of achieving accurate distance measurement even in the configuration in which the transmitting unit uses the VCO direct modulation method and the receiving unit uses the SH method.

Second Embodiment

Similarly to the first embodiment, the present embodiment also relates to a distance measuring device having a mechanism in which an initial phase unique to a radio unit is canceled out using a radio unit suitable for low power consumption. A description will be given below with respect to a distance measuring device, which ignores time-series signal exchange, and an operation of the distance measuring device as in the first embodiment.

Figure 12:
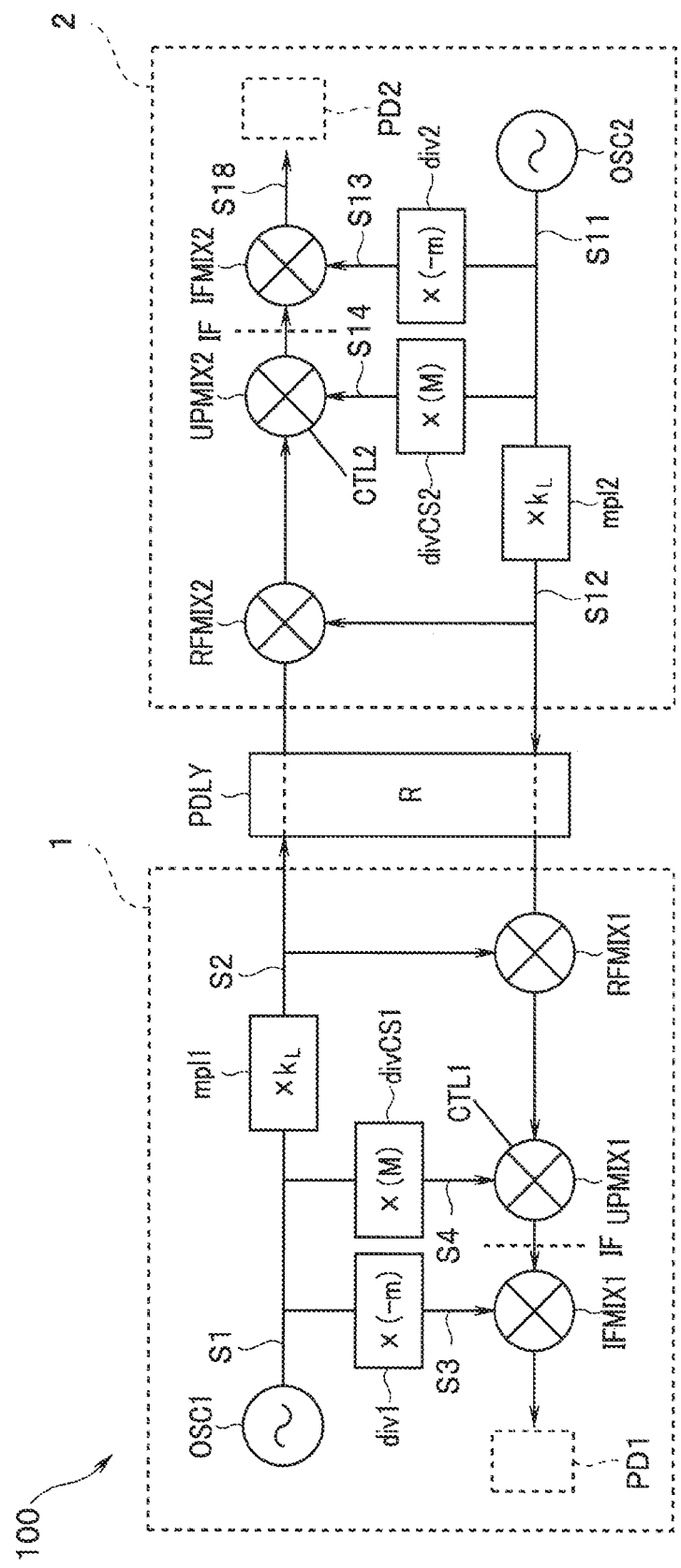
FIG. 12 is a configuration diagram of a radio circuit of a distance measuring system according to a second embodiment in which a distance between two devices is measured.

FIG. 12 illustrates a distance measuring system according to the second embodiment including a device 1, a device 2, and a propagation path PDLY between the device 1 and the device 2. FIG. 12 is a configuration diagram of a radio circuit of the distance measuring system according to the second embodiment in which distance measurement is performed between two devices. Each of the device 1 and the device 2 includes the radio circuit using a low power consumption VCO direct modulation method for a transmitting unit and a low power consumption SH method for a receiving unit.

FIG. 12 illustrates a configuration of the radio unit simplified in the device 1 and the device 2. The device 1 includes an OSC1 which is a device-specific oscillator, a frequency multiplier (mpl1), an RF frequency converter (RFMIX1), a frequency divider (div1), an IF frequency converter (IFMIX1), a reception frequency divider (divCS1), and an up-frequency converter (hereinafter referred to as UPMIX1). The device 2 also has a radio architecture similar to the device 1, and includes an OSC2 which is a device-specific oscillator, a frequency multiplier (mpl2), an RF frequency converter (RFMIX2), a frequency divider (div2), an IF frequency converter (IFMIX2), a reception frequency divider (divCS2), and an up-frequency converter (hereinafter referred to as UPMIX2).

Differences from the configuration of FIG. 9 are that the device 1 is configured such that the reception local-oscillation frequency converter (SWMIX1) is changed into the UPMIX1 and the UPMIX1 receives an output signal of the RFMIX1 and an output signal S4 of the divCS1 and outputs an output signal to the IFMIX1. Differences from the configuration of FIG. 9 are that the device 2 is configured such that the reception local-oscillation frequency converter (SWMIX2) is changed into the UPMIX2 and the UPMIX2 receives an output signal of the RFMIX2 and an output signal S14 of the divCS2 and outputs an output signal to the IFMIX2. The configuration is identical to the configuration of FIG. 9 in that the frequency multiplication factors of the mpl1 and the mpl2 are not changed at the time of transmission and reception.

In other words, the device 1 includes the RFMIX1 which is an RF mixer that receives a signal having a frequency identical to a transmission frequency set using the PLL as an LO input, and the UPMIX1 serving as an up-converter in which an output of the RFMIX1 is subjected to frequency conversion into an intermediate frequency (IF) based on a predetermined divided frequency.

Similarly, the device 2 includes the RFMIX2 which is an RF mixer that receives a signal having a frequency identical to a transmission frequency set using the PLL as an LO input, and the UPMIX2 serving as an up-converter in which an output of the RFMIX2 is subjected to frequency conversion into an intermediate frequency (IF) based on a predetermined divided frequency.

Figure 13:
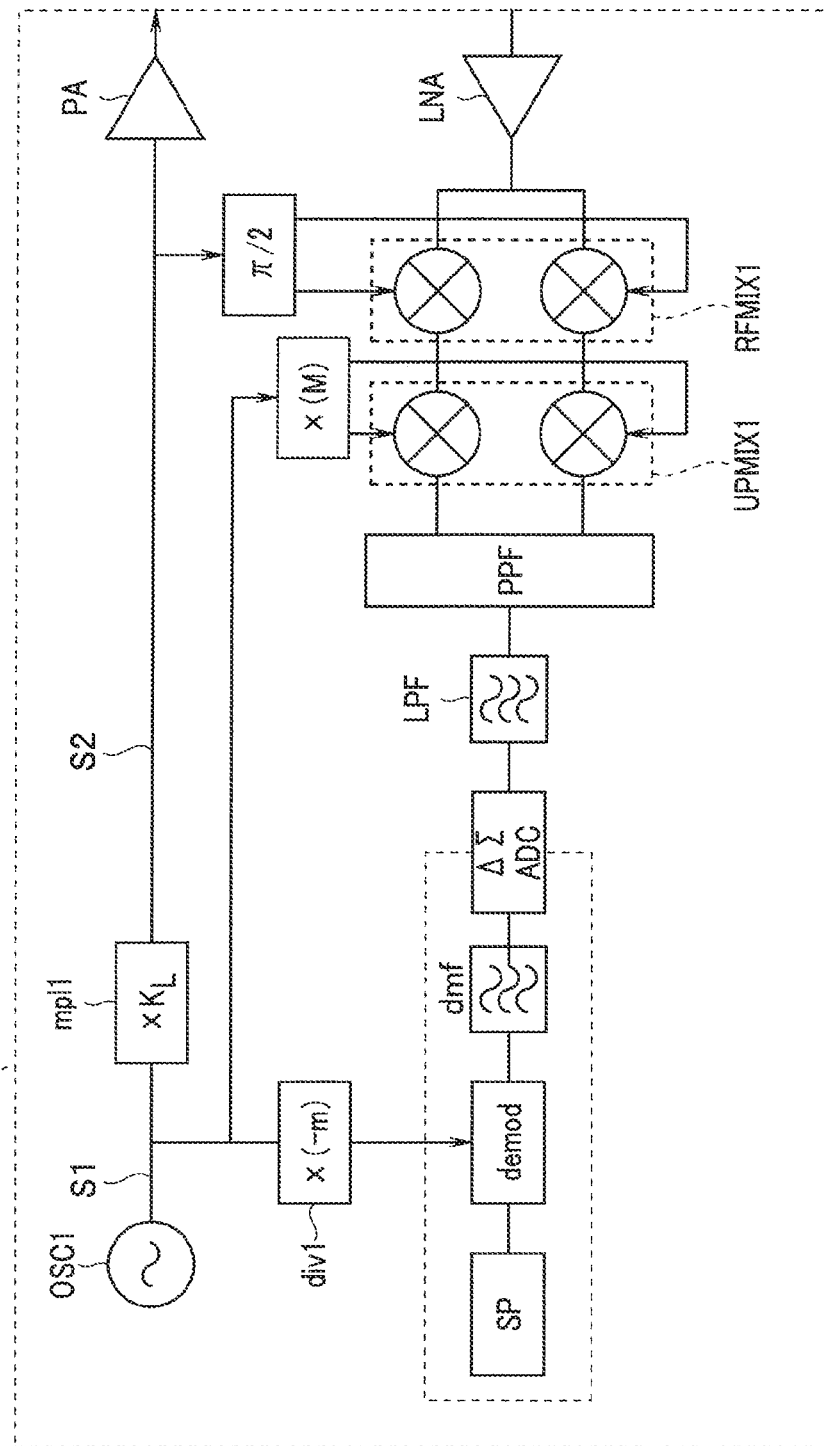
FIG. 13 is a configuration diagram illustrating a specific configuration example of a radio unit of one of two devices according to the second embodiment.

FIG. 13 is a configuration diagram illustrating a specific configuration example of the radio unit of the device 1. FIG. 13 illustrates only the configuration of the device 1, but the device 2 also has a configuration identical to the configuration of the device 1. An output signal S2 of the mpl1 is output as a radio signal from an antenna (not illustrated) via a power amplifier (PA). In other words, the transmitting unit of the radio circuit 11 in the device 1 includes the frequency multiplier mpl1 that generates an RF frequency having a frequency multiplied by a predetermined value based on the OSC1, and the power amplifier (PA) that amplifies the output of the mpl1.

The signal received from the device 2 via the antenna is input to a low-noise amplifier (hereinafter referred to as LNA) via a predetermined filter (not illustrated).

An output signal of the LNA is input to the RFMIX1 that is a quadrature demodulator.

Here, an LO signal, in which the output signal of the mpl1 is phase-shifted at 90 degrees by a 90-degree phase shifter ($\pi/2$), is input to the RFMIX1 as an LO signal for frequency conversion. Outputs of the 90-degree phase shifter and a frequency divider ($\times(M)$) are supplied to the RFMX1 and the UPMIX1, respectively, via a multiplier.

The quadrature output signal of the RFMIX1 becomes substantially a DC signal, is subjected to frequency conversion into an IF signal by an up-mixer (hereinafter referred to as UPMIX1), and is input to a next-stage polyphase filter (hereinafter referred to as PPF). Negative frequency components are suppressed by the PPF, and a desired signal is extracted as an IF signal.

As described above, the receiving unit of the radio circuit 11 in the device 1 includes a low-noise amplifier (LNA) to which the received signal is input, a div1 that frequency-divides the output of the OSC1 into a predetermined frequency, a 90-degree phase shifter ($\pi/2$) that generates a quadrature signal using the output of the mpl1, an RFMIX1 that is a quadrature mixer including the LNA and the 90-degree phase shifter ($\pi/2$) as inputs, an UPMIX1 that inputs an I/Q output from the RFMIX1 and converts a signal frequency using a frequency divider ($\times(M)$), a PPF that receives an output of the UPMIX1 as an input and removes an image signal, a lowpass filter (hereinafter referred to as LPF) that receives an output of the PPF as an input, and a digital unit that is a processing unit.

The digital unit indicated by a dotted line includes a $\Delta\Sigma$-type analog-to-digital converter (hereinafter referred to as $\Delta\Sigma$ADC), a decimation filter (dmf), and a demodulator (demod) that performs demodulation using a clock of the div1.

The output signal of the PPF is converted into a digital signal by the $\Delta\Sigma$ADC via the LPF. The output signal of the LPF is an analog IF signal. Note that the $\Delta\Sigma$ADC oversamples and takes an input signal in order to obtain high resolution. The clock of the $\Delta\Sigma$ADC is not illustrated in the drawings, but is generated from the OSC1. The output of the $\Delta\Sigma$ADC is input to the demodulator (demod) via the decimation filter (dmf) and demodulates the received radio signal. A signal processing unit (hereinafter referred to as SP) outputs the phase information, which is obtained by demodulation, to the processor 13. Note that the SP may calculate distance information using the phase information, and output the calculated distance information to the processor 13. Further, the SP may output correction value information of the distance using amplitude information, or may output to the processor 13 distance information corrected by the correction value information.

Even in the first embodiment, the configuration of the radio unit similar to the radio unit illustrated in FIG. 13 can obviously be obtained when the configuration of the LO signal system is changed with reference to FIG. 9.

In order to describe that the distance measurement can be performed by the configuration of the radio unit according to the present embodiment, a case is considered in which one wave of the first carrier group is transmitted from the device 1 to the device 2 and one wave of the second carrier group is transmitted from the device 2 to the device 1. In other words, accurate distance measurement can be performed without the change in initial phases of the mpl1 and the mpl2 even when a two way in the distance measuring signal is performed between the device 1 and the device 2.

Figure 14:
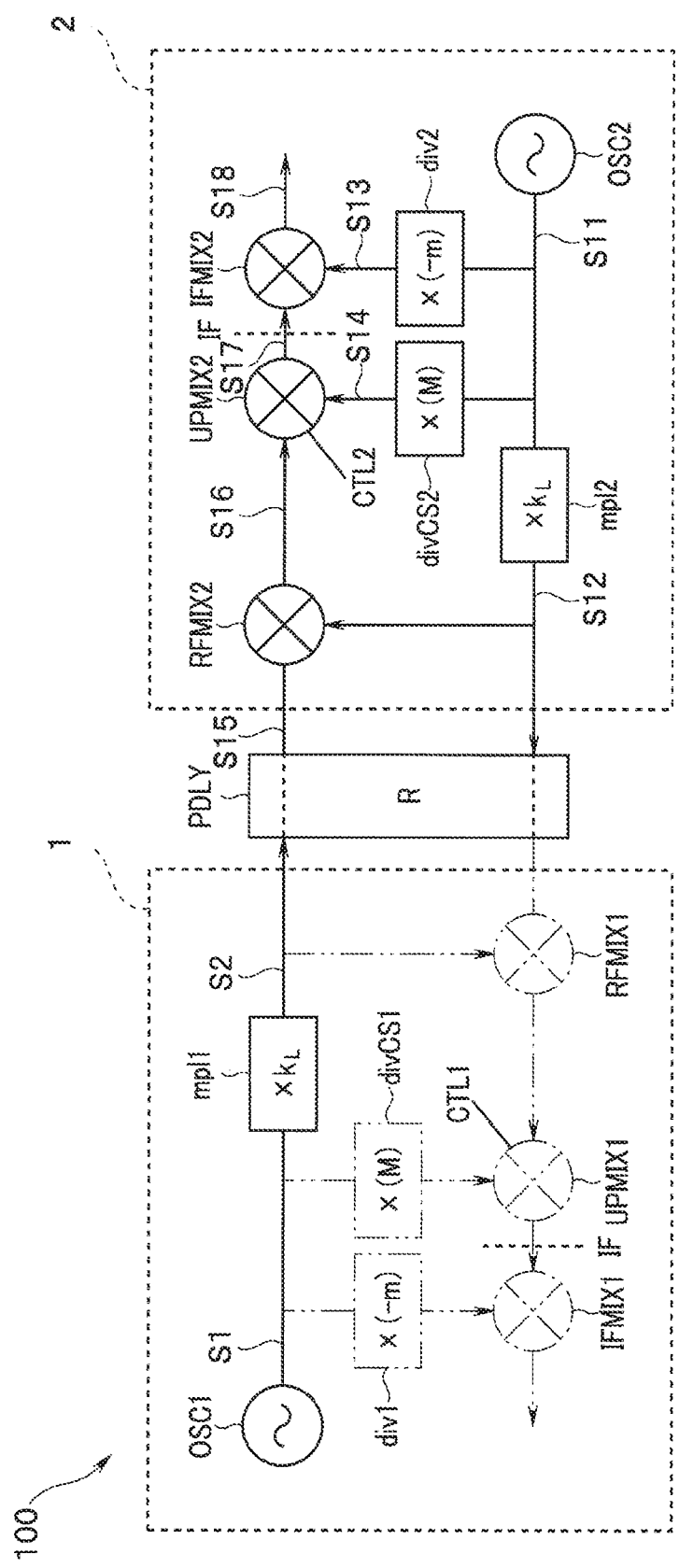
FIG. 14 is a configuration diagram of a radio circuit of the distance measuring system according to the second embodiment for describing a flow of signal processing until one wave of a first carrier group is transmitted from one of two devices to the other device and a phase is detected by the other of the two devices.

First, an interchange of low-frequency distance measuring signals will be described. In this case, a frequency of one wave of the first carrier group transmitted from the device 1 to the device 2 is $k_L f_{x1}$ and a frequency of one wave of the second carrier group transmitted from the device 2 to the device 1 is $k_L f_{x2}$. FIG. 14 illustrates a flow of signal processing until one wave of the first carrier group is transmitted from the device 1 to the device 2 and an output phase is detected by the device 2. FIG. 14 is a configuration diagram of the radio circuit of the distance measuring system for describing the flow of signal processing until one wave of the first carrier group is transmitted from the device 1 to the device 2 and the phase is detected by the device 2. In FIG. 14, the div1, the RFMIX1, the IFMIX1, the divCS1, and the UPMIX1 have no relation to the operation and are indicated by one-dot chain lines. A phase of an output signal S1 of the OSC1 and a phase of an output signal S2 of the mpl1 are expressed by Equations (1) and (2) described above, respectively, and a phase of a signal S15 after passing through the propagation path PDLY is expressed by Equation (27). A local oscillation (LO) signal S12 input to the RFMIX2 is an output signal of the mpl2, and is expressed by Equation (6).

Thus, a frequency of an output signal S16 of the RFMIX2 can be approximated by DC, and a phase is expressed by Equation (44) as follows.

$$\phi_{dcx2}(t)=2\pi k_L(f_{x1}-f_{x2})t+(\theta_{Lx1}-\theta_{Lx2})-2\pi k_L f_{x1}\tau_R \quad (44)$$

Here, the result of extraction of only a desired signal is indicated. The signal S16 is subjected to up-frequency conversion by the UPMIX2 that receives the signal S14 expressed by Equation (28) as an LO input, and a phase of an output signal S17 of the UPMIX2 is expressed by Equation (45) as follows.

$$\phi_{ifx2}(t)=2\pi k_L(f_{x1}-f_{x2})t-2\pi M f_{x2}t+(\theta_{Lx1}-\theta_{Lx2}-\theta_{Fx2})-2\pi k_L f_{x2}\tau_R \quad (45)$$

Further, the signal S17 is converted to DC by the IFMIX2 having an output signal S13 of the div2 as an LO input, and a phase of a signal S18 detected by the device 2 is expressed by Equation (46) as follows.

$$\phi_{ifx2}(t)=2\pi k_L(f_{x1}-f_{x2})t-2\pi(M-m)f_{x2}t+(\theta_{Lx1}-\theta_{Lx2}-\theta_{Fx2})-\theta_{Bx2}-2\pi k_L f_{x1}\tau_R \quad (46)$$

Here, the result of desired quadrature demodulation is described.

Figure 15:
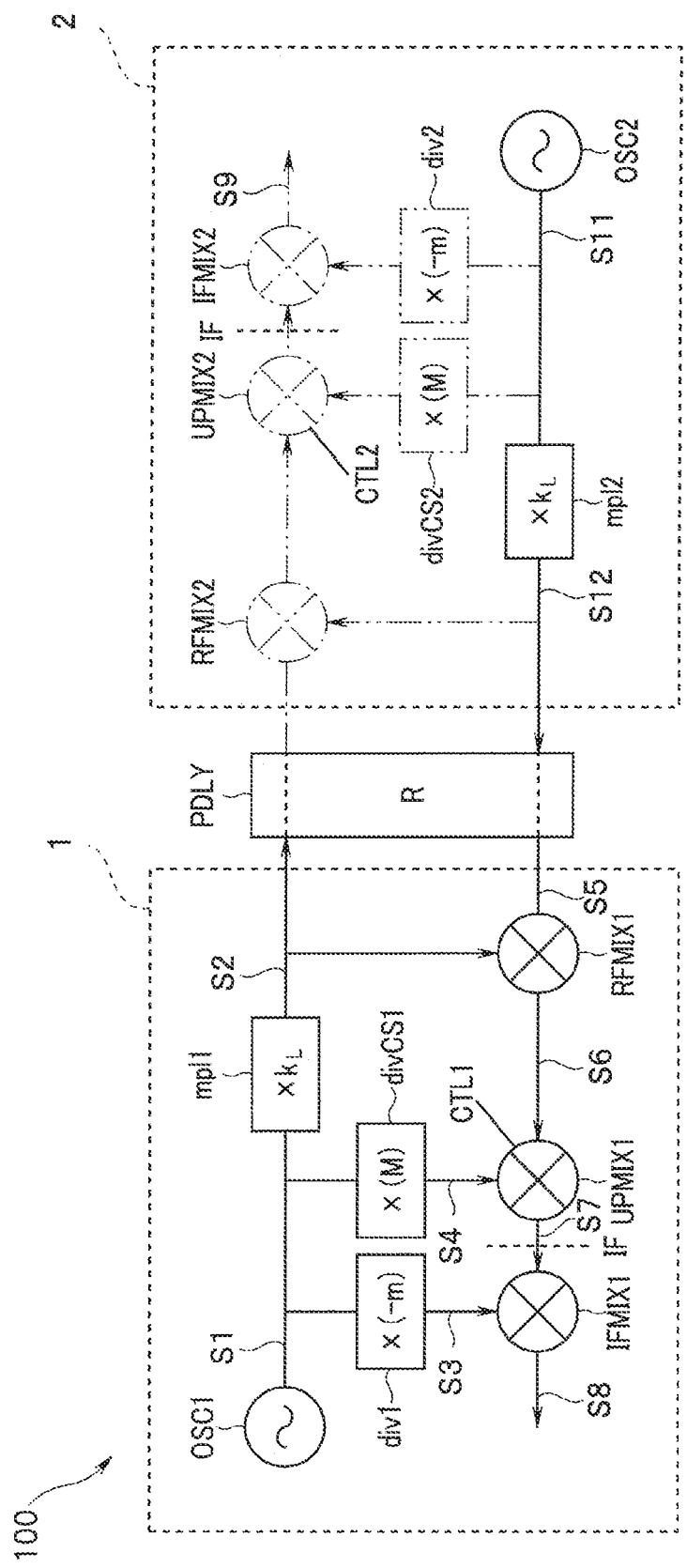
FIG. 15 is a configuration diagram of a radio circuit of the distance measuring system according to the second embodiment for describing a flow of signal processing until one wave of a second carrier group is transmitted from the other of two devices to one device and a phase is detected by one of the two devices.

Next, FIG. 15 illustrates a flow of signal processing until one wave of the second carrier group is transmitted from the device 2 to the device 1 and an output phase is detected by the device 1. FIG. 15 is a configuration diagram of the radio circuit of the distance measuring system for describing the flow of signal processing until one wave of the second carrier group is transmitted from the device 2 to the device 1 and the phase is detected by the device 1. In FIG. 15, the div2, the RFMIX2, the IFMIX2, the divCS2, and the UPMIX2 have no relation to the operation and are indicated by one-dot chain lines. A phase of an output signal S11 of the OSC2 and a phase of an output signal S12 of the mpl2 are expressed by Equations (5) and (6), respectively, and a phase of the signal S5 after passing through the propagation path PDLY is expressed by Equation (12). A local oscillation (LO) signal S2 input to the RFMIX1 is an output signal of the mpl1, and is expressed by Equation (2). Thus, a frequency of an output signal S6 of the RFMIX1 can be approximated by DC, and a phase is expressed by Equation (47) as follows.

$$\phi_{dcx1}(t)=2\pi k_L(f_{x2}-f_{x1})t+(\theta_{Lx2}-\theta_{Lx1})-2\pi k_L f_{x2}\tau_R \quad (47)$$

Here, the result of extraction of only a desired signal is indicated. The signal is subjected to up-frequency conversion by the UPMIX1 that receives the signal S4 expressed by Equation (33) as an LO input, and a phase of an output signal S7 of the UPMIX1 is expressed by Equation (48) as follows.

$$\phi_{ifx1}(t)=2\pi k_L(f_{x2}-f_{x1})t-2\pi M f_{x1}t+(\theta_{Lx2}-\theta_{Lx1}-\theta_{Fx1})-2\pi k_L f_{x2}\tau_R \quad (48)$$

Further, the signal S7 is converted to DC by the IFMIX1 having an output of the div1 as an LO input, and a phase of a signal S8 detected by the device 1 is expressed by Equation (49) as follows.

$$\phi_{BB1L}(t)=2\pi k_L(f_{x2}-f_{x1})t-2\pi(M-m)f_{x1}t+(\theta_{Lx2}-\theta_{Lx1}-\theta_{Fx1})-\theta_{Bx1}-2\pi k_L f_{x2}\tau_R \quad (49)$$

Here, the result of desired quadrature demodulation is described. Equation (50) is obtained as follows by addition of Equation (46) and Equation (49).

$$\phi_{BB1L}(t)+\phi_{BB2L}(t)=2\pi(m-M)(f_{x1}+f_{x2})t-(\theta_{Fx1}+\theta_{Fx2})-(\theta_{Bx1}+\theta_{Bx2})-2\pi k_L(f_{x1}+f_{x2})\tau_R \quad (50)$$

A second term on the right-hand side of Equation (50) represents the addition of the initial phases of the divCS1 and the divCS2 in the device 1 and the device 2, a third term on the right-hand side represents the addition of the initial phases of the div1 and the div2 in the device 1 and the device 2, and the second and third terms are independent and undetectable. Thus, phase uncertainty exists in Equation (50), and accurate distance calculation cannot be performed as it is.

Next, when the transmission frequencies of the device 1 and the device 2 are set to $k_H f_{x1}$ and $k_H f_{x2}$, respectively, the phase signal detected by the device 2 is obtained when the distance measuring signal is transmitted from the device 1 to the device 2 in the same manner as described above. In FIG. 14, $k_L$ is replaced with $k_u$, and accordingly, $\theta_{Lx1}$ is replaced with $\theta_{Hx1}$ and $\theta_{Lx2}$ is replaced with $\theta_{Hx2}$. At this time, the phase of the distance measuring signal detected by the device 2 is expressed by Equation (51) as follows.

$$\phi_{BB2H}(t)=2\pi k_H(f_{x1}-f_{x2})t-2\pi(M-m)f_{x2}t+(\theta_{Hx1}-\theta_{Hx2}-\theta_{Fx2})-\theta_{Bx2}-2\pi k_H f_{x1}\tau_R \quad (51)$$

Similarly, when the distance measuring signal is transmitted from the device 2 to the device 1, the phase detected by the device 1 is obtained. In FIG. 15, $k_L$ is replaced with $k_1$, and accordingly, $\theta_{Lx1}$ is replaced with $\theta_{Hx1}$ and $\theta_{Lx2}$ is replaced with 612. At this time, the phase of the distance measuring signal detected by the device 2 is expressed by Equation (52) as follows.

$$\phi_{BB1H}(t)=2\pi k_H(f_{x2}-f_{x1})t-2\pi(M-m)f_{x1}t+(\theta_{Hx2}-\theta_{Hx1}-\theta_{Fx1})-\theta_{Bx1}-2\pi k_H f_{x1}\tau_R \quad (52)$$

When Equation (51) and Equation (52) are added, Equation (53) is obtained as follows.

$$\phi_{BB1H}(t)+\phi_{BB2H}(t)=2\pi(m-M)(f_{x1}+f_{x2})t-(\theta_{Fx1}+\phi_{Fx2})-(\theta_{Bx1}+\theta_{Bx2})-2\pi k_H(f_{x1}+f_{x2})\tau_R \quad (53)$$

A second term on the right-hand side of Equation (53) represents the addition of the initial phases of the divCS1 and the divCS2 in the device 1 and the device 2, a third term on the right-hand side represents the addition of the initial phases of the div1 and the div2 in the device 1 and the device 2, and the second and third terms are independent and undetectable. Thus, phase uncertainty exists in Equation (53), and accurate distance calculation cannot be performed as it is.

However, the div1, the div2, the divCS1, and the divCS2 in the device 1 and the device 2 are always operating during distance measurement, and the initial phases of the div1, the div2, the divCS1, and the divCS2 are fixed during distance measurement. As will be described below, it is effective, for example, to subtract the phase result detected at two frequencies in order to increase the folding distance caused by the phase distance measurement. By such an operation, the initial phase fixed at the time of distance measurement can be canceled out. In other words, when the difference between Equation (50) and Equation (53) is taken, Equation (54) is obtained as follows.

$$\phi_{BB1L}(t)+\phi_{BB2L}(t)-(\phi_{BB1H}(t)+\phi_{BB2H}(t))=2\pi(k_H-k_L)(f_{x1}+f_{x2})\tau_R \quad (54)$$

The left-hand side represents a phase result detected by the device 1 and the device 2, and the right-hand side represents the product of set frequency information and delay time. Equation (55) equal to Equation (42) described above is obtained as follows from transformation of Equation (54).

$$\tau_R = \frac{\phi_{BB1L}(t) + \phi_{BB2L}(t) - (\phi_{BB1H}(t) - \phi_{BB2H}(t))}{2\pi(k_H - k_L)(f_{x1} + f_{x2})} \quad (55)$$

Equation (56), which is equal to Equation (43), is obtained from the relation of $RC = c \times \tau_R$.

$$R = c \times \frac{\phi_{BB1L}(t) + \phi_{BB2L}(t) - (\phi_{BB1H}(t) - \phi_{BB2H}(t))}{2\pi(k_H - k_L)(f_{x1} + f_{x2})} \quad (56)$$

The reason why the initial phases of the device 1 and the device 2 have been canceled out by the configuration of the radio unit described above will be described. The initial phases are also changed by the change of the frequency multiplication factors of the mpl1 and the mpl2 from Equations (2) and (7), but the change of the initial phases independently depends on the frequency setting value. However, according to the above-described configuration, when the distance measuring signals of the identical frequency are exchanged between the device 1 and the device 2, the multiplication factors of the mpl1 and the mpl2 are constant without being changed during transmission and reception.

The frequency setting is changed during the reception by multiplying the output signals of the divCS1 and the divCS2 by the output signals of the mpl1 and the mpl2. Here, since the divCS1 and the divCS2 continue to operate without stopping during the distance measurement, a fixed initial phase exists. The initial phase is canceled out by the distance measurement of the distance extension by two frequencies.

In a denominator of Equation (56), the $(k_H-k_L)$ has a meaning of increasing the detection distance. In other words, when the distance measurement is performed in one reciprocation of transmission and reception, the frequency setting is either $k_H$ or $k_L$. In this case, the denominator becomes $2\pi k_H(f_{x1}+f_{x2})$ or $2\pi k_L(f_{x1}+f_{x2})$. The $k_H$ and the $k_L$ are not identical but are in the relation of $k_H \approx k_L$. Thus, a detection range of the distance R can be greatly expanded. The existence of such a distance detection range is due to the fact that the phase has a periodicity of $2\pi$. When the frequency is further increased and, for example, the frequency setting of $k_M$ is added, distance detection by the frequency settings $k_L$ and $k_H$, distance detection by the frequency settings $k_L$ and $k_M$, and distance detection by the frequency settings $k_H$ and $k_M$ are obtained. The identical distance is obtained in each case, but since the frequency difference is different, the phase difference results related to the distance are different. In other words, a plurality of distances including the folding distance estimated from the respective phase detection results are calculated, and a matching distance under three frequency conditions is a distance to be obtained. Thus, the probability of erroneous determination of the distance due to the folding effect can be significantly reduced. Hence, the probability of calculating the accurate distance is increased using a large number of frequencies. In addition, phase deviation due to multipath is averaged using a large number of frequencies, and accurate distance can be estimated.

Time differences among signals in Equations (46), (49), (51), and (52) are not considered, so the result of Equation (56) corresponds to simultaneous transmission and reception of four waves. In FIGS. 12, 14, and 15, each of the device 1 and the device 2 includes one transmitting and receiving unit, but Equation (56) requires that the each of the device 1 and the device 2 has a transmitting and receiving unit of two systems. A time-division transmission and reception sequence is required to operate the transmitting and receiving unit of one system in the device 1 and the device 2. The sequence will be described below.

By using the configuration of the radio unit and the distance measurement technique of the present embodiment, accurate distance measurement can also be performed even in a radio band requiring a carrier sense. The carrier sense is to receive and detect a signal in a frequency band to be transmitted. At this time, it is possible to cancel out the initial phase difference and the frequency difference between the devices by modifying the LO signal shown in the first and second embodiments. For example, the device 1 of the first embodiment illustrated in FIG. 11 can receive the signal of the frequency $k_L f_{x1}$ if by operating the divCS1, the SWMIX1, the RFMIX1, and the IFMIX1 before transmitting the signal of the frequency $k_L f_{x1}$.

In the second embodiment described above, the signal output from the transmitting unit is branched and also used for the local oscillation signal of the receiving unit, and the initial phase of the transmitting unit and the initial phase of the receiving unit of the device 1 and the device 2 are canceled out when the received signal frequency-converted by the local oscillation signal of the receiving unit is multiplied by a first frequency-divided signal frequency-divided by the first frequency divider of the reference oscillator which is constantly operating during the distance measurement, and then is multiplied by the second frequency-divided signal divided by the second frequency divider of the reference oscillator which is constantly operating during the distance measurement. In the present embodiment, the distance measuring signals using at least two frequencies are detected by the device 1 and the device 2, and the distance is obtained from the difference between two additional values of the two phases detected by the two devices.

As described above, according to the above-described embodiment, it is possible to provide the distance measuring device and the distance measuring method capable of achieving accurate distance measurement even in the configuration in which the transmitting unit uses the VCO direct modulation method and the receiving unit uses the SH method.

Third Embodiment

In the first embodiment, since time differences among signals in Equations (31), (36), (38), and (39) are not considered, the result of Equation (43) is equivalent to simultaneous transmission and reception of four waves. In the second embodiment, since time differences among signals in Equations (46), (49), (51), and (52) are not considered, the result of Equation (56) is equivalent to simultaneous transmission and reception of four waves. In FIGS. 9 and 12, each of the device 1 and the device 2 includes one transmitting and receiving unit. Equations (43) and (56) require that the transmitting and receiving units of the device 1 and the device 2 each have two systems. In order to operate the device 1 and the device 2 as one system of the transmitting and receiving unit of the device 1 and the device 2, a time-division transmission/reception sequence is required. The transmission/reception sequence of the first embodiment will be described below. In addition, since the second embodiment uses the same equation as the first embodiment, the description about the transmission/reception sequence of the second embodiment will be omitted.

FIG. 9 illustrates that distance measurement can be performed under the condition that the device 1 and the device 2 do not transmit simultaneously. When a distance measuring signal is transmitted in a time division manner, the phase rotates due to the influence of the frequency and frequency error of the device 1 and the device 2, and therefore the timing for distance measurement affects the distance measurement error. A distance measurement error can be corrected by properly setting the timing for distance measurement.

Figure 16:
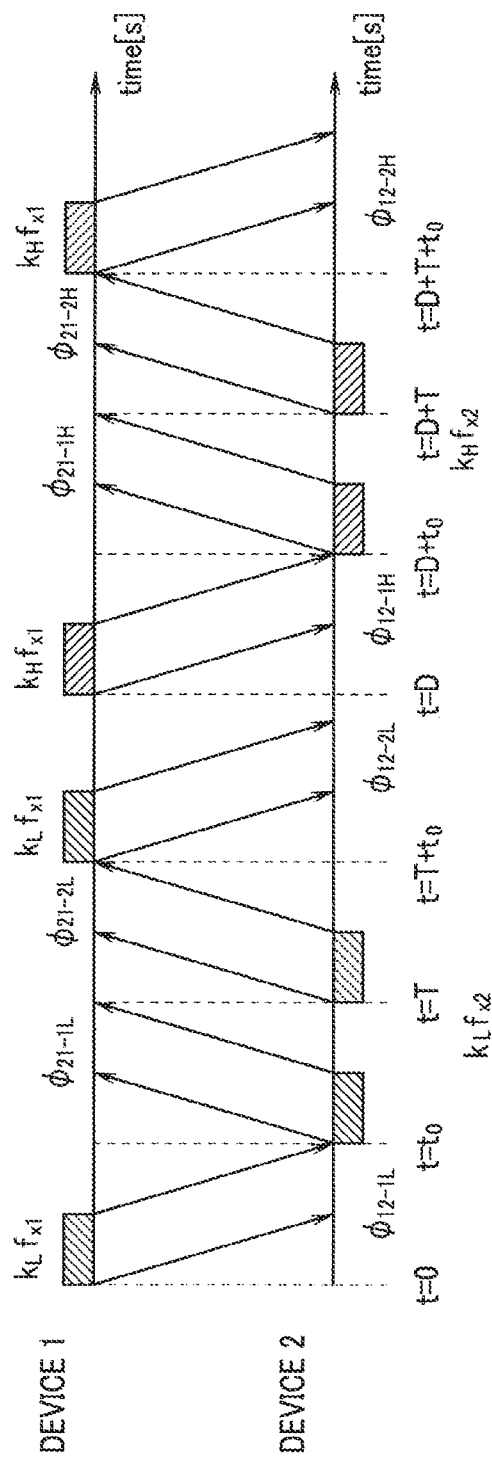
FIG. 16 is a timing chart of a distance measuring signal transmitted and received in a plurality of times according to a third embodiment.

FIG. 16 is a timing chart of distance measuring signals transmitted and received in a plurality of times. It is assumed that the output phase for receiving and detecting by the device 2 the distance measuring signal transmitted from the device 1 at 0 [s] is $\phi_{12\text{-}1L}$, the output phase for receiving and detecting by the device 1 the distance measuring signal transmitted from the device 2 at $t_0$ is $\phi_{21\text{-}1L}$, the output phase for receiving and detecting by the device 1 the distance measuring signal transmitted from the device 2 at T is $\phi_{n\text{-}2L}$, and the output phase for receiving and detecting by the device 2 the distance measuring signal transmitted from the device 1 at $(T+t_0)$ is $\phi_{12\text{-}2L}$. So far, the transmission frequency from the device 1 is $k_L f_{x1}$, and the transmission frequency from the device 2 is $k_L f_{x2}$.

Next, a distance measuring operation is performed with a similar distance measuring sequence by changing the frequency. The transmission frequency from the device 1 is $k_H f_{x1}$, and the transmission frequency from the device 2 is $k_H f_{x2}$. It is assumed that the output phase for receiving and detecting by the device 2 the distance measuring signal transmitted from the device 1 at D [s] is $\phi_{12\text{-}1H}$, the output phase for receiving and detecting by the device 1 the distance measuring signal transmitted from the device 2 at $(D+t_0)$ is $\phi_{21\text{-}1H}$, the output phase for receiving and detecting by the device 1 the distance measuring signal transmitted from the device 2 at $(D+T)$ is $\phi_{21\text{-}2H}$, and the output phase for receiving and detecting by the device 2 the distance measuring signal transmitted from the device 1 at $(D+T+t_0)$ is $\phi_{12\text{-}2H}$.

The following describes that a distance measuring signal is transmitted in accordance with the timing described above, the detected phase is obtained, and the distance can be measured. In other words, each transceiver of the device 1 and the device 2 transmits and receives two or more first carrier signals and two or more second carrier signals in a plurality of times in a time division manner. The $\phi_{12\text{-}1L}(t)$ is equal to equation (31) since the device 1 transmits a distance measuring signal from time reference 0 [s]. Therefore, Equation (57) is established as follows.

$$\phi_{12\text{-}1L}(t)=2\pi k_L(f_{x1}-f_{x2})t-2\pi(M-m)f_{x2}t+(\theta_{Lx1}-\theta_{Lx2}-\theta_{Fx2})-\theta_{Bx2}-2\pi k_L f_{x1}\tau_R \quad (57)$$

Next, a distance measuring signal is transmitted from the device 2 to the device 1 at $t=t_0$ [s]. Since the reference signals of the device 1 and the device 2 are independent, the device 2 does not know the time of the device 1, but can know the approximate time by receiving the distance measuring signal of the device 1. For example, assuming that the distance is measured up to about 10 [m], the propagation delay of 10 [m] is about 33 [ns], and the time is considered based on the time when the device 2 recognizes the reception, the time difference between the device 1 and the device 2 becomes that value. Since $t_0$ is assumed to be 33 [μs] or more, the error is about 1/1000, and the degradation of distance measurement accuracy due to this can be ignored. Here, for simplicity, the analysis is performed assuming that the time reference of the device 2 is the same as that of the device 1. With respect to the phase at which the distance measuring signal transmitted from the device 2 is detected by the device 1, Equation (58) is obtained as follows with reference to Equation (36).

$$\phi_{21\text{-}1L}(t+t_0)=2\pi k_L(f_{x2}-f_{x1})(t+t_0)-\theta_{Bx1}(M-m)f_{x1}(t+t_0)+(\theta_{Lx2}-\theta_{Lx1}-\theta_{Fx1})-\theta_{Bx1}-2\pi k_L f_{x2}\tau_R \quad (58)$$

Again, the phase at which the distance measuring signal transmitted from the device 2 at t=T is detected by the device 1 is expressed by Equation (59) as follows.

$$\phi_{21\text{-}2L}(t+T)=2\pi k_L(f_{x2}-f_{x1})(t+T)-2\pi(M-m)f_{x1}(t+T)+(\theta_{Lx2}-\theta_{Lx1}-\theta_{Fx1})-\theta_{Bx1}-2\pi k_L f_{x2}\tau_R \quad (59)$$

Next, the phase at which the distance measuring signal transmitted from the device 1 at time $t=(T+t_0)$ is detected by the device 2 is expressed by Equation (60) as follows.

$$\phi_{12\text{-}2L}(t+T+t_0)=2\pi k_L(f_{x1}-f_{x2})(t+T+t_0)-2\pi(M-m)f_{x2}(t+T+t_0)+(\theta_{Lx1}-\theta_{Lx2}-\theta_{Fx2})-\theta_{Bx2}-2\pi k_L f_{x1}\tau_R \quad (60)$$

When Equations (57), (58), (59), and (60) are added, Equation (61) is obtained as follows.

$$\phi_{12\text{-}1L}(t)+\phi_{21\text{-}1L}(t+t_0)+\phi_{21\text{-}2L}(t+T)+\phi_{12\text{-}2L}(t+T+t_0)=4\pi(m-M)(f_{x1}+f_{x2})t-2(\theta_{Fx1}+\theta_{Fx2})-2(\theta_{Bx1}+\theta_{Bx2})-4\pi k_L(f_{x1}+f_{x2})\tau_R \quad (61)$$

This result shows that the initial phases of divCS1 and divCS2 are in the second term on the right-hand side, the initial phases of div1 and div2 are in the third term on the right-hand side, and the time-varying phase difference due to the frequency division difference between divCS1 and div1 and the frequency division difference between divCS2 and div2 is in the first term. The result also shows that if it goes as it is, phase uncertainty is present, and the right-hand side is a value twice the right-hand side of Equation (37). In the sequence of FIG. 16, next, $k_L$ is set to $k_H$, and the sequence in which the offset time D is added continues. When the phases detected in the order of the device 2, the device 1, the device 1, and the device 2 are respectively $\phi_{12\text{-}1H}(t+D)$, $\phi_{21\text{-}1H}(t+D+t_0)$, $\phi_{21\text{-}2H}(t+D+T)$, and $\phi_{12\text{-}2H}(t+D+T+t_0)$, the detected phase is expressed by Equations as follows.

$$\phi_{12\text{-}1H}(t+D)=2\pi k_H(f_{x1}-f_{x2})(t+D)-2\pi(M-m)f_{x2}(t+D)+(\theta_{Hx1}-\theta_{Hx2}-\theta_{Fx2})-\theta_{Bx2}-2\pi k_H f_{x1}\tau_R \quad (62)$$

$$\phi_{21-1H}(t+D+t_0)=2\pi k_H(f_{x2}-f_{x1})(t+D+t_0)-2\pi(M-m)f_{x1}(t+D+t_0)+(\theta_{Hx2}-\theta_{Hx1}-\theta_{Fx1})-\theta_{Bx1}-2\pi k_H f_{x2}\tau_R \quad (63)$$

$$\phi_{21-2H}(t+D+T)=2\pi k_H(f_{x2}-f_{x1})(t+D+T)-2\pi(M-m)f_{x1}(t+D+T)+(\theta_{Hx2}-\theta_{Hx1}-\theta_{Fx1})-\theta_{Bx1}-2\pi k_H f_{x1}\tau_R \quad (64)$$

$$\phi_{12-2H}(t+D+T+t_0)=2\pi k_H(f_{x1}-f_{x2})(t+D+T+t_0)-2\pi(M-m)f_{x2}(t+D+T+t_0)+(\theta_{Hx1}-\theta_{Hx2}-\theta_{Fx2})-\theta_{Bx2}-2\pi k_H f_{x1}\tau_R \quad (65)$$

Similar to Equation (61), when Equations (62), (63), (64), and (65) are added, Equation (66) is obtained as follows.

$$\phi_{12-1H}(t+D)+\phi_{21-1H}(t+D+t_0)+\phi_{21-2H}(t+D+T)+\phi_{12-2H}(t+D+T+t_0)=4\pi(m-M)(f_{x1}+f_{x2})t-2(\theta_{Fx1}+\theta_{Fx2})-2(\theta_{Bx1}+\theta_{Bx2})-4\pi k_H(f_{x1}+f_{x2})\tau_R \quad (66)$$

This result shows that the initial phases of divCS1 and divCS2 are in the second term on the right-hand side, the initial phases of div1 and div2 are in the third term on the right-hand side, and the time-varying phase difference due to the frequency division difference between divCS1 and div1 and the frequency division difference between divCS2 and div2 is in the first term. The result also shows that if it goes as it is, phase uncertainty is present, and the right-hand side is a value twice the right-hand side of Equation (40). However, the first term, the second term, and the third term on the right-hand side of Equation (61) and the first term, the second term, and the third term on the right-hand side of Equation (66) are the same value, and thus when subtracting, those terms become 0. As described above, the subtraction of Equation (61) and Equation (66) is an operation that can increase the distance. When the subtraction is performed, Equation (67) is obtained as follows.

$$\phi_{12-1L}(t)+\phi_{21-1L}(t+t_0)+\phi_{21-2L}(t+T)+\phi_{12-2L}(t+T+t_0)-\\(\phi_{12-1H}(t+D)+\phi_{21-1H}(t+D+t_0)+\phi_{21-2H}(t+D+T)+\\\phi_{12-2H}(t+D+T+t_0))=4\pi(k_H-k_L)(f_{x1}+f_{x2})\tau_R \quad (67)$$

The left-hand side is the addition/subtraction of the output phase that can be detected by the sequence, the right-hand side is the multiplication of the frequency setting value and the delay time $\tau_R$, and there are no unknown variables other than $\tau_R$. Accordingly, from $\tau_R=R/c$, the distance R is expressed by Equation (68) as follows.

$$R = \frac{\phi_{12-21-L}(t) - \phi_{12-21-H}(t)}{4\pi(k_H - k_L)(f_{x1} + f_{x2})} \quad (68)$$

Here, $\phi_{12-21-H}(t)$ and $\phi_{12-21-L}(t+T+t_0)$ are expressed by Equations (69) and (70) as follows, respectively.

$$\phi_{12-21-H}(t)=\phi_{12-1H}(t+D)+\phi_{21-1H}(t+D+t_0)+\phi_{21-2H}(t+D+T)+\phi_{12-2H}(t+D+T+t_0) \quad (69)$$

$$\phi_{12-21-L}(t)=\phi_{12-1L}(t)+\phi_{21-1L}(t+t_0)+\phi_{21-2L}(t+T)+\phi_{12-2L}(t+T+t_0) \quad (70)$$

The equation (68) means that the distance is obtained from the detected phases of the device 1 and the device 2 and the frequency setting information. In other words, the phase error due to the frequency difference between the devices included in the phases detected by the device 1 and the device 2 and the phase error due to the initial phase difference between the devices are all corrected by the four-time alternating sequence illustrated in FIG. 16. The inherent phase of the transmission signal is corrected by one reciprocation between the devices, the frequency difference between the devices is corrected by two reciprocations, and the similar two reciprocations are performed by changing the frequency, whereby the inherent phase difference for demodulation between the device 1 and the device 2 is corrected.

As described above, by using the four-time alternating sequence illustrated in FIG. 16, the same result as the result of simultaneous transmission and reception can be obtained. In other words, the initial phase difference and the frequency difference between the communicating devices are canceled, and a correct distance measurement result can be obtained. As described above, even if the configuration of the radio unit is advantageous with low power consumption, that is, the transmission uses the direct VCO modulation method and the reception uses the heterodyne method, the initial phase difference and the frequency difference between the devices can be canceled by using such a sequence, and thus, highly accurate distance measurement can be realized.

As described above, according to the above-described first, second, and third embodiments, it is possible to provide a distance measuring device realizing the accurate distance measurement even when the transmitting unit uses the VCO direct modulation method and the receiving unit uses the SH method.

In the above-described first, second, and third embodiments, since a distance error is caused by a delay inherent in the radio unit and a delay of the RF filter in the previous stage of the antenna, calibration for detecting the delay in advance is required. As described in Japanese Patent Application Laid-Open Publication No. 2018-155724, the receiving unit needs to receive the signal of the transmitting unit during the calibration. In this case, it is possible to operate the transmitting and receiving unit at the same time, output a signal of frequency $k_L f_{x1}$ from the transmitting unit, and receive the transmitted output at the receiving unit. From the received phase result, the delay inherent in the radio unit and the RF filter delay can be calculated. The calibration may be performed for the frequency $k_H f_{x1}$.

Figure 17:
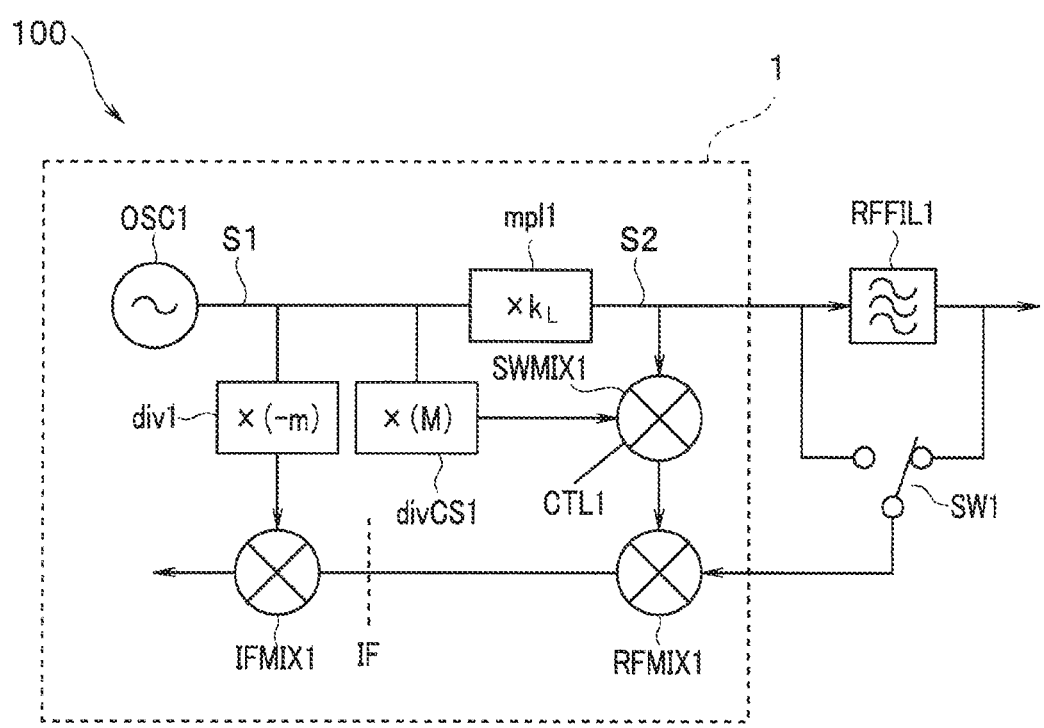
FIG. 17 is a configuration diagram in which a calibration function is added to one of the two devices according to the first embodiment.

FIG. 17 is a configuration diagram obtained by adding a calibration function to the configuration illustrated in FIG. 9 according to the first embodiment. Although FIG. 17 illustrates only the device 1, the device 2 has the same configuration. The difference from FIG. 9 is that an RF filter (hereinafter, referred to as RFFIL1) is connected to the mpl1 output, and a switch (hereinafter, referred to as SW1) for selecting one of input and output of the RFFIL1 is added to have a portion to be connected to the RFMIX1 via the SW1. Although not illustrated, there may be two or more RFMIX1 input units, and a connection between the SW1 dedicated to the calibration path and the RFMIX1 may be provided. The processor 13 controls switching of the SW1.

Figure 18:
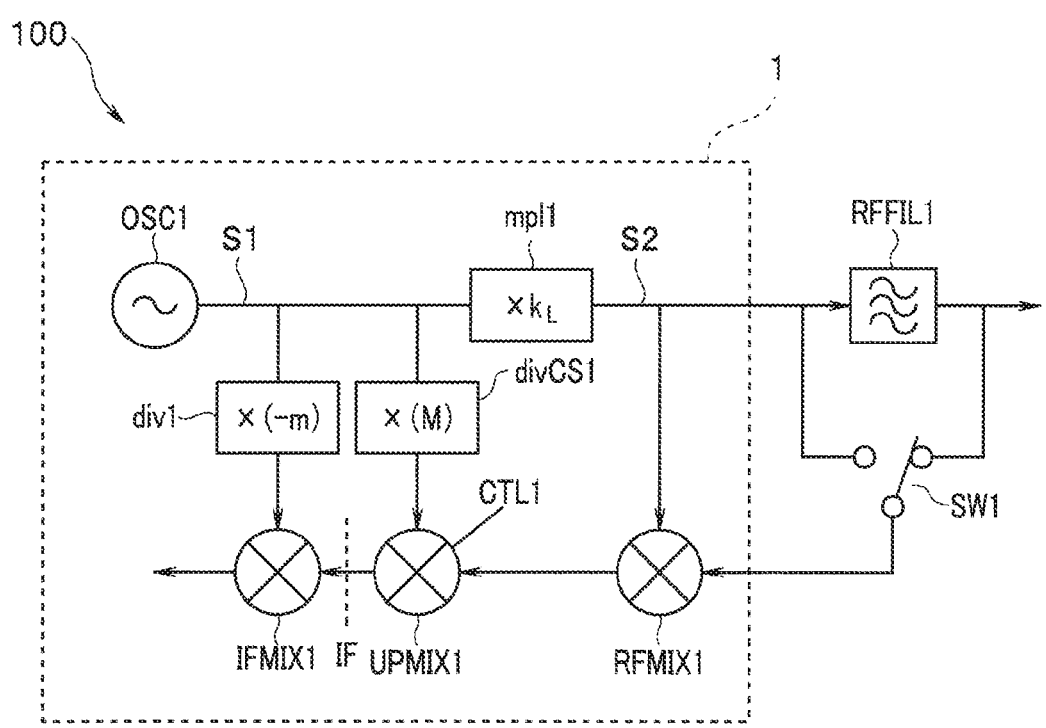
FIG. 18 is a configuration diagram in which a calibration function is added to one of the two devices according to the second embodiment.

FIG. 18 is a configuration diagram obtained by adding a calibration function to the configuration illustrated in FIG. 12 according to the second embodiment. Although FIG. 18 illustrates only the device 1, the device 2 has the same configuration. The difference from FIG. 12 is that the RFFIL1 is connected to the mpl1 output and the SW1 for selecting one of input and output of the RFFIL1 is added to have a portion to be connected to the RFMIX1 via the SW1. Although not illustrated, there may be two or more RFMIX1 input units, and a connection between the SW1 dedicated to the calibration path and the RFMIX1 may be provided.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. A distance measuring device configured to calculate a distance based on carrier phase detection, the distance measuring device comprising:
a calculation unit configured to, based on phase information acquired by a first device and a second device, at least one of the devices being movable, calculate a distance between the first device and the second device,
the first device including:
a first reference signal source; and
a first transceiver configured to transmit two or more first carrier signals using an output of the first reference signal source and to receive two or more second carrier signals, wherein
a transmitting unit of the first transceiver has a configuration to directly modulate the output of the first reference signal source, and
a receiving unit of the first transceiver has a configuration of a heterodyne method or a Low-IF method,
the second device including:
a second reference signal source that operates independently of the first reference signal source; and
a second transceiver configured to transmit the two or more second carrier signals using an output of the second reference signal source and to receive the two or more first carrier signals, wherein
a transmitting unit of the second transceiver has a configuration to directly modulate the output of the second reference signal source, and
a receiving unit of the second transceiver has a configuration of a heterodyne method or a Low-IF method, wherein
a set value of a frequency group of the two or more first carrier signals and a set value of a frequency group of the two or more second carrier signals are identical or substantially identical to each other,
all signals of the two or more first carrier signals and the two or more second carrier signals are transmitted and received in a plurality of times by time division,
the calculation unit calculates the distance based on a phase detection result obtained by receiving the first carrier signals and the second carrier signals, and
the first and second reference signal sources operate continuously so as to hold an initial phase during a period when the two or more first carrier signals and the two or more second carrier signals are transmitted and received by the first and second transceivers.

2. The distance measuring device according to claim 1, wherein
the first transceiver includes a first phase detector configured to detect respective phases of the two or more second carrier signals, and
the second transceiver includes a second phase detector configured to detect respective phases of the two or more first carrier signals.

3. The distance measuring device according to claim 1, wherein
the first device includes: a first local oscillation signal generation unit configured to generate a frequency obtained by adding or subtracting a predetermined divided frequency of a reference frequency of the first reference signal source and a transmission frequency set using a phase locked loop; and a first RF mixer configured to receive an output of the first local oscillation signal generation unit as a local oscillation input to convert a received signal into an intermediate frequency, and
the second device includes: a second local oscillation signal generation unit configured to generate a frequency obtained by adding or subtracting a predetermined divided frequency of a reference frequency of the second reference signal source and a transmission frequency set using a phase locked loop; and a second RF mixer configured to receive an output of the second local oscillation signal generation unit as a local oscillation input to convert a received signal into an intermediate frequency.

4. The distance measuring device according to claim 1, wherein
the first device includes: a first RF mixer configured to receive a signal having a frequency identical to a transmission frequency set using a phase locked loop as a local oscillation input; and a first up-converter configured to convert an output of the first RF mixer into an intermediate frequency based on a predetermined divided frequency, and
the second device includes: a second RF mixer configured to receive a signal having a frequency identical to a transmission frequency set using a phase locked loop as a local oscillation input; and a second up-converter configured to convert an output of the second RF mixer into an intermediate frequency based on a predetermined divided frequency.

5. A distance measuring device configured to calculate a distance based on carrier phase detection, the distance measuring device comprising:
a calculation unit configured to, based on phase information acquired by a first device and a second device, at least one of the devices being movable, calculate a distance between the first device and the second device,
the first device including:
a first reference signal source; and
a first transceiver configured to transmit two or more first carrier signals using an output of the first reference signal source and to receive two or more second carrier signals,
the second device including:
a second reference signal source that operates independently of the first reference signal source; and
a second transceiver configured to transmit the two or more second carrier signals using an output of the second reference signal source and to receive the two or more first carrier signals, wherein
a frequency group of the two or more first carrier signals and a frequency group of the two or more second carrier signals are identical or substantially identical to each other,
the calculation unit calculates the distance based on a phase detection result obtained by receiving the first carrier signals and the second carrier signals, and
the first and second reference signal sources operate continuously during a period when the first and second carrier signals are transmitted and received by the first and second transceivers, wherein
the first device includes: a first RF mixer configured to receive a signal having a frequency identical to a transmission frequency set using a phase locked loop as a local oscillation input and a first up-converter configured to convert an output of the first RF mixer into an intermediate frequency based on a predetermined divided frequency, and the second device includes: a second RF mixer configured to receive a signal having a frequency identical to a transmission frequency set using a phase locked loop as a local oscillation input and a second up-converter configured to convert an output of the second RF mixer into an intermediate frequency based on a predetermined divided frequency, a transmitting unit of the first transceiver includes:
a first frequency multiplier configured to generate an RF frequency having a frequency multiplied by a predetermined value based on the first reference signal source; and
a first power amplifier configured to amplify an output of the first frequency multiplier, a receiving unit of the first transceiver includes:
a first low-noise amplifier to which a received signal is input;
a first frequency divider configured to divide the output of the first reference signal source into a predetermined frequency;
a first 90-degree phase shifter configured to generate a quadrature signal using the output of the first frequency multiplier;
a first quadrature mixer configured to have the first low-noise amplifier and the first 90-degree phase shifter as inputs;
a first up-mixer configured to receive an I/Q output of the first quadrature mixer as an input and to convert a signal frequency using the first frequency divider;
a first polyphase filter configured to receive an output of the first up-mixer as an input and to remove an image signal;
a first lowpass filter configured to receive an output of the first polyphase filter as an input; and
a first processing unit including a $\Delta\Sigma$-type analog-to-digital converter, a decimation filter, and a demodulator configured to perform demodulation using a clock of the first frequency divider, a transmitting unit of the second transceiver includes:
a second frequency multiplier configured to generate an RF frequency having a frequency multiplied by a predetermined value based on the second reference signal source; and
a second power amplifier configured to amplify an output of the second frequency multiplier, and a receiving unit of the second transceiver includes:
a second low-noise amplifier to which a received signal is input;
a second frequency divider configured to divide the output of the second reference signal source into a predetermined frequency;
a second 90-degree phase shifter configured to generate a quadrature signal using the output of the second frequency multiplier;
a second quadrature mixer configured to have the second low-noise amplifier and the second 90-degree phase shifter as inputs;
a second up-mixer configured to receive an I/Q output of the second quadrature mixer as an input and to convert a signal frequency using the second frequency divider;
a second polyphase filter configured to receive an output of the second up-mixer as an input and to remove an image signal;
a second lowpass filter configured to receive an output of the second polyphase filter as an input; and
a second processing unit including a $\Delta\Sigma$-type analog-to-digital converter, a decimation filter, and a demodulator configured to perform demodulation using a clock of the first frequency divider.

6. A distance measuring method of calculating a distance based on carrier phase detection performed by a first device and a second device including a first transceiver and a second transceiver configured to transmit and receive two or more first carrier signals and two or more second carrier signals, respectively, a set value of a frequency group of the two or more first carrier signals and a set value of a frequency group of the two or more second carrier signals being identical or substantially identical to each other, a transmitting unit of each of the first and second transceivers having a configuration to directly modulate an output of each of a first reference signal source and a second reference signal source, a receiving unit of each of the first and second transceivers having a configuration of a heterodyne method or a Low-IF method, the method comprising:
transmitting the two or more first carrier signals using an output of a first reference signal source in the first device;
transmitting the two or more second carrier signals using an output of a second reference signal source independent of the first reference signal source in the second device;
receiving the two or more second carrier signals and obtaining two or more first phase detection results in the first device;
receiving the two or more first carrier signals and obtaining two or more second phase detection results in the second device;
allowing the first and second reference signal sources to operate continuously so as to hold an initial phase during a period when the first and second carrier signals are transmitted and received by the first and second transceivers; and
calculating a distance between the first device and the second device based on the first and second phase detection results.

7. The distance measuring method according to claim 6, wherein
the first transceiver and the second transceiver transmit and receive all signals of the two or more first carrier signals and the two or more second carrier signals in a plurality of times by time division.

8. The distance measuring method according to claim 6, wherein
one of the first transceiver and the second transceiver transmits a single carrier signal in a time-division manner,
another of the first transceiver and the second transceiver receives the single carrier signal,
the first transceiver and the second transceiver perform frequency difference correction and initial phase correction by time-division transmission and reception of the single carrier signal in a plurality of times, and
the distance is corrected based on phase correction information for correcting a phase error occurring when an initial phase at the time of transmission is different from an initial phase at the time of reception.

* * * * *